(12) United States Patent
Bortolussi et al.

(10) Patent No.: US 6,292,575 B1
(45) Date of Patent: *Sep. 18, 2001

(54) REAL-TIME FACIAL RECOGNITION AND VERIFICATION SYSTEM

(75) Inventors: Jay F. Bortolussi, Andover; Francis J. Cusack, Jr., Groton; Dennis C. Ehn, Newton Centre; Thomas M. Kuzeja, Norfolk; Michael S. Saulnier, Stoneham, all of MA (US)

(73) Assignee: LAU Technologies, Littleton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,485

(22) Filed: Jul. 20, 1998

(51) Int. Cl.[7] .................................................. G06K 9/00
(52) U.S. Cl. ........................ 382/118; 382/107; 382/165; 382/170; 382/190; 382/257
(58) Field of Search ................................. 382/118, 116, 382/173, 225, 170, 171, 107, 117, 165, 190, 257; 345/435

(56) References Cited

U.S. PATENT DOCUMENTS

| | | | |
|---|---|---|---|
| 5,164,992 | 11/1992 | Turk et al. | 382/2 |
| 5,386,103 | 1/1995 | DeBan et al. | 235/379 |
| 5,675,663 | 10/1997 | Koerner et al. | 382/181 |
| 5,710,833 | 1/1998 | Moghaddam et al. | 382/228 |
| 5,719,951 | 2/1998 | Shackleton et al. | 382/118 |
| 5,740,274 | 4/1998 | Ono et al. | 382/190 |

OTHER PUBLICATIONS

T. S. Jebara et al., "Parametrized Structure from Motion for 3D Adaptive Feedback Tracking of Faces," *IEEE*, pp. 144–150 (1997).

P. N. Belhumeur et al., "Eigenfaces vs. Fisherfaces: Recognition Using Class Specific Linear Projection," *IEEE Transactions on Pattern Analysis and Machine Intelligence*, vol. 19, pp. 711–720 (Jul. 1997).

Chai et al. "Face segmentation using skin–color map in videophone applications." IEEE Transactions on Circuits and Systems for Video Technology, vol. 94. pp. 551–564, Jun. 1999.*

Chai et al. "Locating facial region of a head–and–shoulders color image." Third IEEE International Conference on Automatic Face and Gesture Recognition, Apr. 1998, Proceedings. pp. 124–129.*

Imagawa et al. "Color–based hands tracking system for sign language recognition." Third IEEE International Conference on Automatic Face and Gesture Recognition, 1999. Proceedings. pp. 462–467, Apr. 1998.*

* cited by examiner

*Primary Examiner*—Bhavesh Mehta
(74) *Attorney, Agent, or Firm*—Lahive & Cockfield, LLP; Anthony A. Laurentano

(57) ABSTRACT

A system and method for acquiring, processing, and comparing an image with a stored image to determine if a match exists. In particular, the system refines the image data associated with an object based on pre-stored color values, such as flesh tone color. The system includes a storage element for storing flesh tone colors of a plurality of people, and a defining stage for localizing a region of interest in the image. A combination stage combines the unrefined region of interest with one or more pre-stored flesh tone colors to refine the region of interest based on color. This flesh tone color matching ensures that at least a portion of the image corresponding to the unrefined region of interest having flesh tone color is incorporated into the refined region of interest. Hence, the system can localize the head, based on the flesh tone color of the skin of the face in a rapid manner. According to one practice, the refined region of interest is smaller than or about equal to the unrefined region of interest.

58 Claims, 13 Drawing Sheets

REAL-TIME FACIAL RECOGNITION AND VERIFICATION SYSTEM

BACKGROUND OF THE INVENTION

The present invention relates to systems for identifying an individual, and in another case, verifying the individual's identity to perform subsequent tasks, such as allowing access to a secured facility or permit selected monetary transactions to occur.

Modern identification and verification systems typically provide components that capture an image of a person, and then with associated circuitry and hardware, process the image and then compare the image with stored images, if desired. In a secured access environment, a positive match between the acquired image of the individual and a pre-stored image allows access to the facility.

The capture and manipulation of image data with modern identification systems places an enormous processing burden on the system. Prior art systems have addressed this problem by using Principal Component Analysis (PCA) on image data to reduce the amount of data that needs to be stored to operate the system efficiently. An example of such a system is set forth in U.S. Pat. No. 5,164,992, the contents of which are hereby incorporated by reference. However, certain environmental standards need still be present to ensure the accuracy of the comparison between the newly acquired image of the pre-stored image. In particular, the individual is generally positioned at a certain location prior to capturing the image of the person. Additionally, the alignment of the body and face of the individual is controlled to some degree to ensure the accuracy of the comparison. Lighting effects and other optical parameters are addressed to further ensure accuracy. Once the individual is positioned at the selected location, the system then takes a snapshot of the person, and this still image is processed by the system to determine whether access is granted or denied.

The foregoing system operation suffers from a real time cost that slows the overall performance of the system. Modern system applications require more rigorous determinations in terms of accuracy and time in order to minimize the inconvenience to people seeking access to the facility or attempting to perform a monetary transaction, such as at an automated teller machine (ATM). Typical time delays in order to properly position and capture an image of the person, and then compare the image with pre-stored images, is in the order of 3 to 5 seconds or even longer. Consequently, these near real-time systems are quickly becoming antiquated in today's fast paced and technology dependent society. There thus exists a need in the art to develop a real-time facial identification and verification system that in real-time acquires and processes images of the individual.

Accordingly, an object of this invention is to provide a real-time identification and verification system.

Another object of this invention is to provide an identification system that simplifies the processing of the acquired image while concomitantly enhancing the accuracy of the system.

Other general and more specific objects of the invention will in part be obvious and will in part appear from the drawings and description which follow.

SUMMARY OF THE INVENTION

The present invention provides systems and methods of a facial recognition system for acquiring, processing, and comparing an image with a stored image to determine if a match exists. The facial recognition system determines the match in substantially real time. In particular, the present invention employs a motion detection stage, blob stage and a color matching stage at the input to localize a region of interest (ROI) in the image. The ROI is then processed by the system to locate the head, and then the eyes, in the image by employing a series of templates, such as eigen templates. The system then thresholds the resultant eigenimage to determine if the acquired image matches a pre-stored image.

This invention attains the foregoing and other objects with a system for refining an object within an image based on color. The system includes a storage element for storing flesh tone colors of a plurality of people, and a defining stage for localizing a region of interest in the image. Generally, the region is captured from a camera, and hence the ROI is from image data corresponding to real-time video. This ROI is generally unrefined in that the system processes the image to localize or refine image data corresponding to preferred ROI, such as a person's head. In this case, the unrefined region of interest includes flesh tone colors. A combination stage combines the unrefined region of interest with one or more pre-stored flesh tone colors to refine the region of interest based on the color. This flesh tone color matching ensures that at least a portion of the image corresponding to the unrefined region of interest having flesh tone color is incorporated into the refined region of interest. Hence, the system can localize the head, based on the flesh tone color of the skin of the face in a rapid manner. According to one practice, the refined region of interest is smaller than or about equal to the unrefined region of interest.

According to one aspect, the system includes a motion detector for detecting motion of the image within a field of view, and the flesh tone colors are stored in any suitable storage element, such as a look-up-table. The flesh tone colors are compiled by generating a color histogram from a plurality of reference people. The resultant histogram is representative of the distribution of colors that constitute flesh tone color.

According to another aspect, a blob stage is also employed for connecting together selected pixels of the object in the image to form a selected number of blobs. This stage in connection with the motion detector rapidly and with minimal overhead cost localize a ROI within the image.

According to another aspect, the system when generating the flesh tone colors employs a first histogram stage for sampling the flesh tone colors of the reference people to generate a first flesh tone color histogram. The color is then transformed into ST color space. The system can also optionally employ a second histogram stage for generating a second color histogram not associated with the face within the image, and which is also transformed into ST color space.

According to still another aspect, the system comprises an erosion operation to the image data corresponding, for example, to a face, to separate pixels corresponding to hair from pixels corresponding to face, as well as to reduce the size of an object within the image, thereby reducing the size of the unrefined region of interest.

According to yet another aspect, the system also performs a dilation operation to expand one of the region of interests to obtain the object (e.g., face or eyes) within the image.

The present invention also contemplates a facial recognition and identification system for identifying an object in an image. The system includes an image acquisition element for acquiring the image, a defining stage for defining an unrefined region of interest corresponding to the object in the image, and optionally a combination stage for combining the unrefined region of interest with pre-stored flesh tone colors to refine the region of interest to ensure at least a portion of the image corresponding to the unrefined region of interest includes flesh tone color. The refined region of interest can be smaller than or about equal to the unrefined region of interest.

According to another aspect, the system also includes a detection module for detecting a feature of the object.

According to another aspect, the combination stage combines a blobs with one or more of flesh tone colors to develop or generate the ROI.

According to another aspect, the system further includes a compression module for generating a set of eigenvectors of a training set of people in the multi-dimensional image space, and a projection stage for projecting the feature onto the multi-dimensional image space to generate a weighted vector that represents the person's feature corresponding to the ROI. A discrimination stage compares the weighted vector corresponding to the feature with a pre-stored vector to determine whether there is a match.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

The present invention relates to an image identification and verification system that can be used in a multitude of environments, including access control facilities, monitory transaction sites and other secured installations. The present invention has wide applicability to a number of different fields and installations, but for purposes of clarity will be discussed below in connection with an access control verification and identification system. The following use of this example is not to be construed in a limiting sense.

Figure 1:
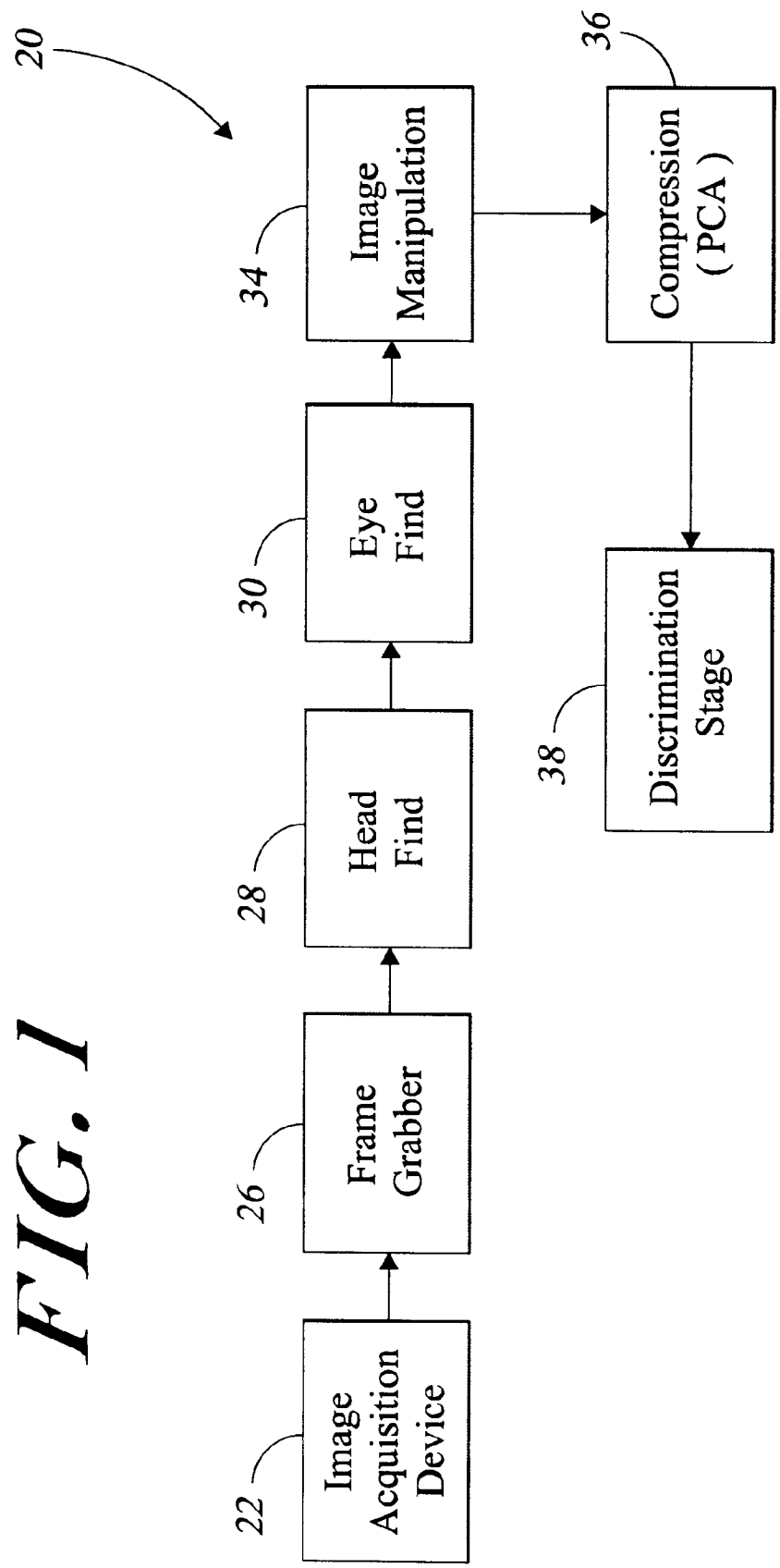
FIG. 1 is a schematic block diagram of a real time facial recognition system according to the teachings of the present invention.

FIG. 1 illustrates a facial identification and verification system 20 according to the teachings of the present invention. The illustrated system 20 includes a multitude of serially connected stages. These stages include an image acquisition stage 22, a frame grabber stage 26, a head find stage 28, an eye find stage 30, and an image manipulation stage 34. These stages function to acquire an image of an object, such as a person, and digitize it. The head and eyes are then located within the image. The image manipulation stage 34 places the image in suitable condition for compression and subsequent comparison with pre-stored image identification information. Specifically, the output of the image manipulation stage 34 serves as the input to a compression stage 36, which can be a principal component analysis compression stage. This stage produces eigenvectors from a reference set of images projected into a multi-dimensional image space. The vectors are then used to characterize the acquired image. The compression stage 36 in turn generates an output signal which serves as an input to a discrimination stage 38, which determines whether the acquired image matches a pre-stored image.

Figure 2:
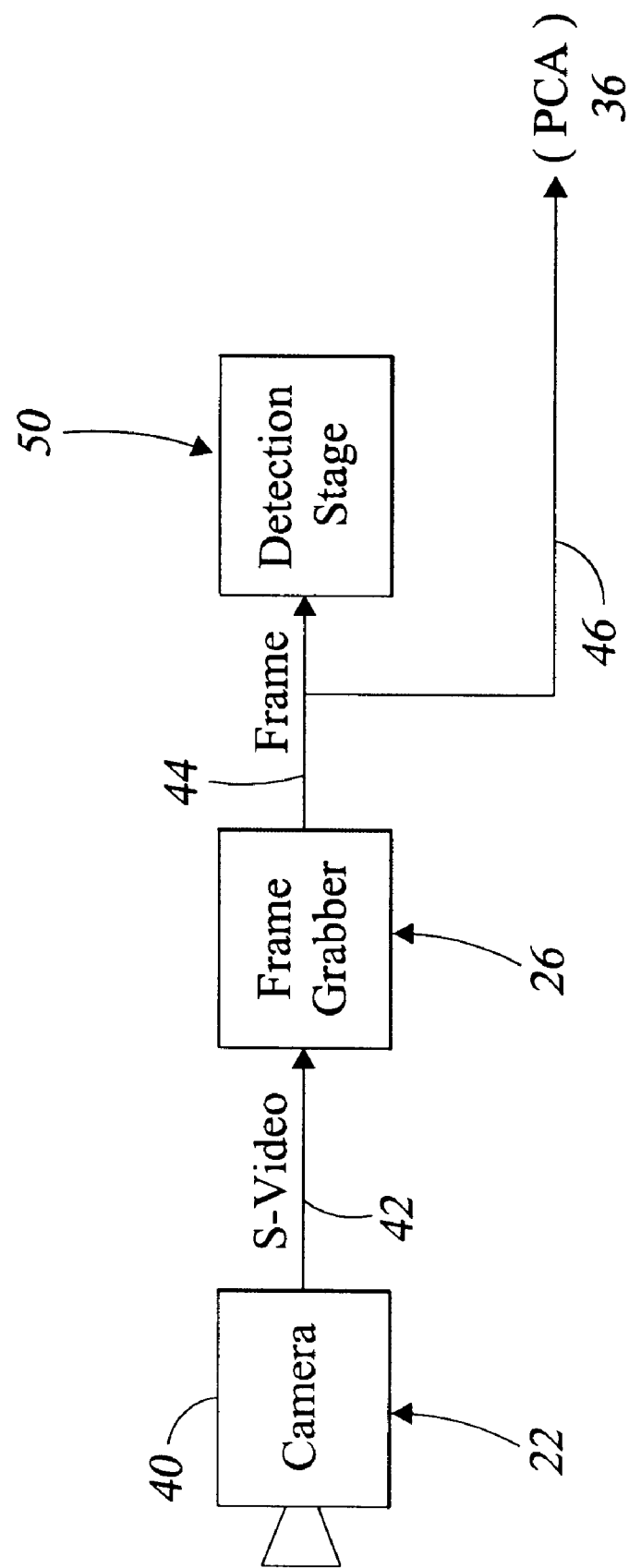
FIG. 2 is a schematic block diagram of the image acquisition and detection portions of the real time facial recognition system of FIG. 1 in accordance with the teachings of the present invention.

FIG. 2 illustrates in further detail the front end portion of the system 20. The image acquisition stage 22 includes a video camera 40, which produces an S-video output stream 42 at conventional frame rates. Those of ordinary skill will appreciate that the video camera used herein may be a monochrome camera, a full color camera, or a camera that is sensitive to non-visible portions of the spectrum. Those skilled in the art will also appreciate that the image acquisition stage 22 may be realized as a variety of different types of video cameras and in general, any suitable mechanism for providing an image of a subject may be used as the image acquisition stage 22. The image acquisition stage 22 may, alternatively, be an interface to a storage device, such as a magnetic storage medium or other components for storing images or image data. As used herein, "image dater" refers to data such as luminance values, chrominance values, grey scale and other data associated with, defining or characterizing an image.

The video output stream 42 is received by a frame grabber 26, which serves to latch frames of the S-video input stream and to convert the S-video analog signal into a digitized output signal, which is then processed by the remainder of the system 20. It is known that conventional video cameras produce an analog video output stream of 30 frames per second, and thus the frame grabber 26 is conventionally configured to capture and digitize image frames as this video rate. The video camera need not be limited to S-video, and can include near IR or IR mode, which utilizes RS170 video.

The frame grabber 26 produces a digitized frame output signal 44 which is operatively communicated with multiple locations. As illustrated, the output signal 44 communicates with a broadly termed detection stage 50, which corresponds at least in part to the head find stage 28 of FIG. 1. The output signal 44 also communicates with the compression stage 36, which is described in further detail below. Those of ordinary skill will realize that the camera itself can digitize acquired images, and hence the frame grabber stage 26 can be integrated directly into the camera.

Figure 3:
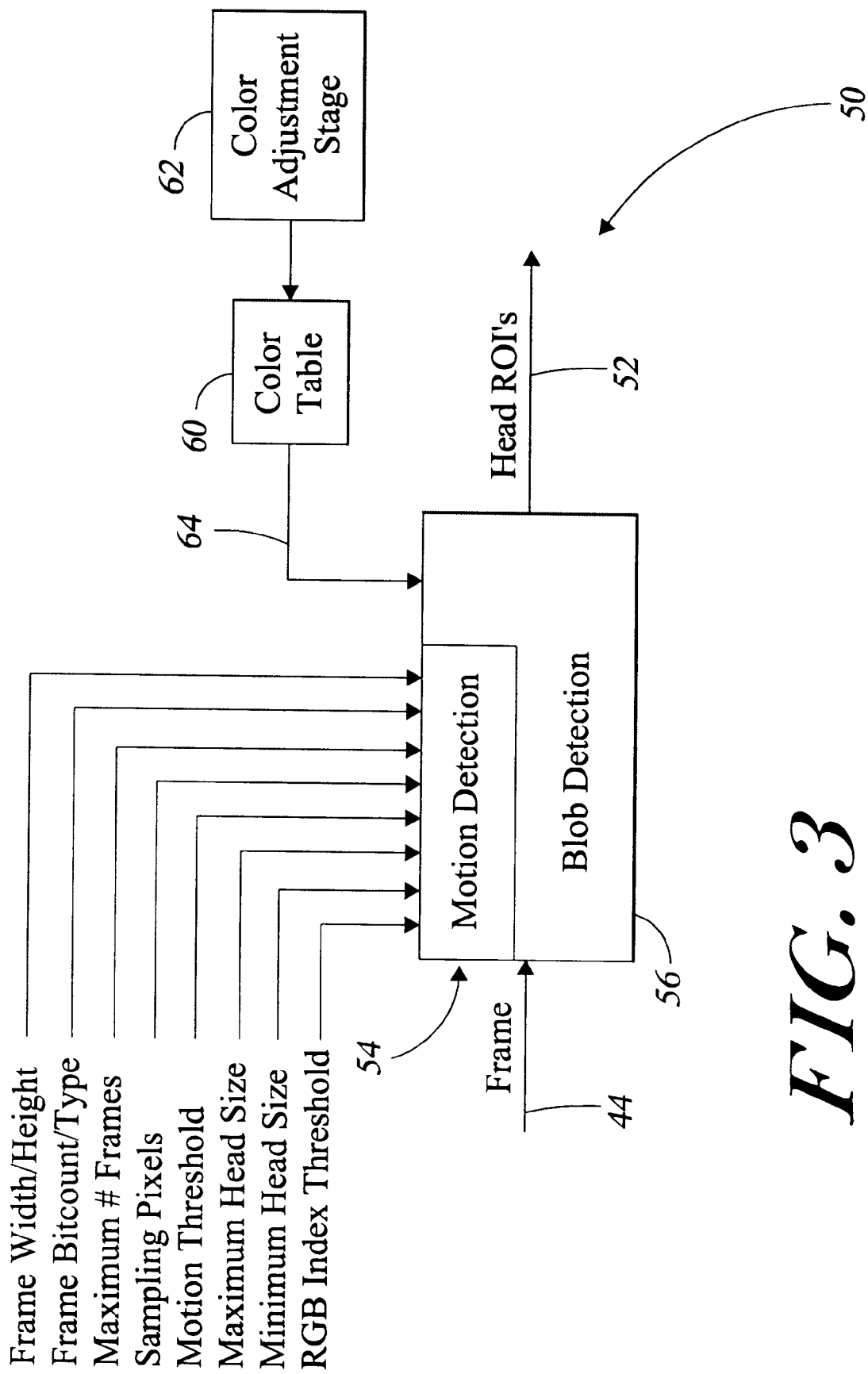
FIG. 3 is more detailed schematic depiction of the detection stage of FIG. 2, which includes a color matching stage in accord with the teachings of the present invention.

FIG. 3 is a further schematic depiction of the detection stage 50 of FIG. 2. The video frame signal 44 is received by the detection stage 50. The signal comprises an N by N array of pixels, such as a 256×256 pixel array, which have selected chrominance and luminance values. The pixels are inputted into the detection stage 50, and preferably are analyzed first by the motion detection stage 54. The motion detection stage 54 receives a number of input signals, as illustrated, such as signals corresponding to frame width and height, frame bit counts and type, maximum number of frames, selected sampling pixel rate, motion threshold values, maximum and minimum head size, and RGB index threshold values. One or more of these additional input signals in combination with the frame input signal 44 trigger the motion detection stage to assess whether motion has occurred within the field of view. In particular, the motion detection stage 54 is adapted to detect subtle changes in pixel values, such as luminance values, which represent motion, especially when an object moves against a relatively still background image (such as a kiosk, cubicle or hallway). One method of determining motion is to perform a differencing function on selected pixels in successive frames, and then comparing changes in pixel values against a threshold value. If the pixel variations within the field of view exceed the threshold value, then an object is deemed to have moved within the image. Conversely, if the changes are below the threshold, the system determines that no suitable motion has occurred.

According to another technique, a spatio-temperal filtering scheme can be applied to the captured image to detect motion, as set forth in U.S. Pat. No. 5,164,992 of Turk et al., the contents of which are hereby incorporated by reference. In this scheme, a sequence of image frames from the camera 40 pass through a spatio-temperal filtering module which accentuates image locations which change with time. The spatio-temperal filtering module identifies within the frame the locations and motion by performing a differencing operation on successive frames of the sequence of image frames. A typical output of a conventional spatio-temperal filter module have the moving object represented by pixel values having significantly higher luminance than areas of non-motion, which can appear as black.

The spatio-temperal filtered image then passes through a thresholding module which produces a binary motion image identifying the locations of the image for which the motion exceeds a threshold. Those of ordinary skill will recognize that the threshold can be adjusted to select a certain degree of motion. Specifically, minor movements within the field of view can be compensated for by requiring heightened degrees of motion within the field of view in order to trigger the system. Hence, the thresholding module can be adjusted to locate the areas of the image containing the most motion. This filtering scheme is particularly advantageous in monitoring transaction environments where an individual seeking access to, for example, an ATM machine, would have to approach the ATM machine, and thus create motion within the field of view.

According to one practice, once the detection stage 50 has detected motion and determines that the motion of the object within the field of view exceeds a selected threshold, the blob detection stage 56 analyzes the binary motion image generated by the motion detection stage 54 to determine whether motion occurs within the field of view, for example, by sensing a change in pixel content over time. From this information, the blob detection stage 56 defines a region of interest (ROI) roughly corresponding to the head position of the person in the field of view. This ROI is truly a rough approximation of the region corresponding to the head and practically is an area larger than the head of the person, although it may also be a region of about the same size. The blob detection stage employs known techniques to define and then correlate an object (e.g., the head of a person) in the image. The present invention realizes that the motion information can be employed to roughly estimate the region of interest within the image that corresponds to the person's head. In particular, the blob detection stage 56 designates a "blob" corresponding roughly to the head or ROI of the person within the field of view. A blob is defined as a contiguous area of pixels having the same uniform property, such as grey scale, luminance, chrominance, and so forth. Hence, the human body can be modeled using a connected set of blobs. Each blob has a spatial and color Gaussian distribution, and can have associated therewith a support map, which indicates which pixels are members of a particular blob. The ability to define blobs through hardware (such as that associated with the blob detection stage 56) is well known in the art, although the blob detection stage 56 can also be implemented in software. The system therefore clusters or blobs together pixels to create adjacent blobs, one of which corresponds to a person's head, and hence is defined as the ROI.

According to another practice and with further reference to FIG. 3, the color table 60 can be employed to further refine the ROI corresponding to the head. The word "refine" is intended to mean the enhancement, increase or improvement in the clarity, definition and stability of the region of interest, as well as a further refinement in the area defined as the region corresponding to the person's head. For example, as discussed above, the ROI established by the motion detection stage is a rough region, larger than the head, that defines a general area within which the head can be found. Flesh tone colors can be employed to "lighten" or reduce the ROI characterizing the person's head to better approximate the area corresponding to the head. This process serves to overall refine the region of interest. The color table is intended to be representative of any suitable data storage medium that is accessible by the system in a known manner, such as RAM, ROM, EPROM, EEPROM, and the like, and is preferably a look-up table (LUT) that stores values associated with flesh tone colors of a sample group.

The present invention realizes that people of different races have similar flesh tones. These flesh tones when analyzed in a three-dimensional color or RGB space are similarly distributed therein and hence lie essentially along a similar vector. It is this realization that enables the system to store flesh tone colors in a manner that allows for the rapid retrieval of color information. The flesh tone color values are created by sampling a reference set of people, e.g., 12–20 people, and then creating a histogram or spatial distribution representative of each of the three primary colors that constitute flesh tone, e.g., red, blue and green, using the reference set of people as a basis in ST color space ($H_f$). Alternatively, separate histograms for each color can be created. The color histogram is obtained by first reducing the 24 bit color to 18 bit color, generating the color histogram, and then transforming or converting it into ST color space from the intensity profile in the RGB space. The system then obtains the non-face color histogram in ST color space ($H_n$). This is obtained by assuming that non-face color is also uniformly distributed in the RGB space. The histogram is then converted into ST color space. The transformation into ST color space is performed according to the following two equations:

$$S=(B-G)/(R+G+B) \qquad \text{(Eq. 1)}$$

$$T=(2R-G-B)/(R+G+B) \qquad \text{(Eq. 2)}$$

The color histograms are then normalized by converting $H_f$ and $H_n$ to $P_f$ and $P_n$ according to Bayes Rule, which determines the face probability within the color space. Consequently, the normalized face can be represented as:

$$P_{face}=P_f/(P_f+P_n) \qquad \text{(Eq. 3)}$$

The system then calculates the width and height of the table, as well as the values of the face probability look-up table 60 according to the following formula:

$$LUT[i]=P_{face}[i]\times 255 \qquad \text{(Eq. 4)}$$

A certain portion of the resultant histogram(s) is then defined, for example, about 90% of the histogram or class width, for each of the colors in the histogram. This defines upper and lower limits of color values that are deemed acceptable by the system when determining whether the input pixel values of the frame 44 are representative of flesh tone. These histogram color distributions are then stored in the color table 60.

The system 20 further includes a color adjustment stage 62 that is employed to change or to adjust the flesh tone color values stored within the table. For example, if additional people are sampled, these color distribution values can be combined with the histogram values stored in the table.

Figure 4A:
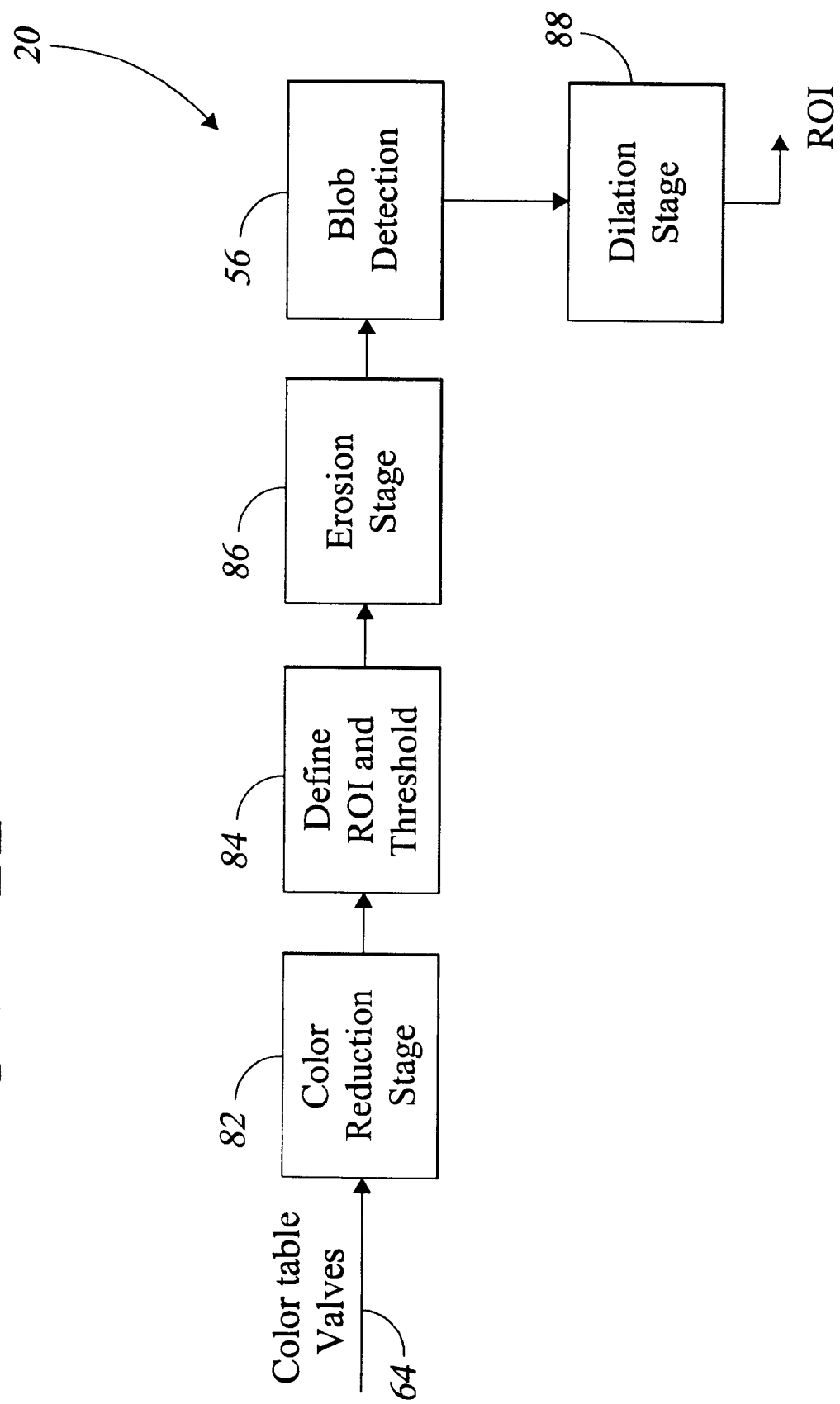
FIG. 4A is another detailed schematic block diagram depiction of the detection stage illustrating the erosion and dilation operations performed on the image according to the teachings of the present invention.

With reference to FIG. 4A, during face detection, the color table values 64 are introduced to a color reduction stage which reduces the color from 24 bit to 16 bit for ease of handling. This can be performed using known techniques. The detection stage 50 then further defines the ROI. The detection stage 50 ignores darker colors by setting to zero any pixel having a value less than 16. The system also includes a threshold stage 84 that compares the rough ROI with a threshold value to convert it to a binary image. An erosion stage 86 performs an erosion operation on the binary image to remove noise and disconnect hair pixels from face pixels. The erosion operation reduces the size of an object by eliminating area around the object edges, and eliminates foreground image details smaller than a structuring element. This increases the spacing between the face and the hair in the image. The erosion operation can be performed as follows:

$$A \bigotimes B = \cdot (A)_{-b} \text{ if } b:(x,y) \text{ then } -b(-x,-y) \qquad \text{(Eq. 5)}$$

$b \in B$

Those of ordinary skill will realize that erosion is the intersection of all translations, where a translation is the subtraction of a structuring element set member from an object set member. The symbol $\bigotimes$ is used to signify the erosion of one set by another. In equation 5, A is the set representing the image (ROI), B is the set representing the structuring element, and b is a member of the structuring element set B. Additionally, the symbol $(A)_{-b}$ denotes the translation of A by −b. After the erosion operation is completed, the detection stage 50 performs the connected component blob analysis 56 on the ROI.

After the blob analysis is performed on the image by the blob detection stage 56, the dilation stage 88 performs a dilation operation thereon to obtain the face regions within the ROI. The dilation operation is employed to expand or thicken the ROI, and is thus the inverse operation of erosion. Furthermore, the dilation operation is the union of all translations of the image by the structuring element members, and is defined as follows:

$$A \bigotimes B = U(A)_b \qquad \text{(Eq. 6)}$$

$b \in B$ The symbol $\bigotimes$ signifies the erosion of one set by another. In equation 6, A is the set representing the image, B is the set representing the structuring element, and b is a member of the structuring element set B. Additionally, the term $(A)_b$ represents the translation of A by b. According to one practice, the set B can be defined as including the following coordinates {(0, 0), (0, 1), (1, 0), (1, 1)}. The output of the dilation stage is the ROI. The system can further process the image data by defining the largest area as the dominant face region, and merge other smaller face regions into the dominant face region. The center of the ROI is then determined by placing a 128×128 pixel box on the ROI (e.g., face) by setting its center as:

X center=X (mean of dominant face region)

Y center=top of the face region+average_sampled_ face_height/4

Figure 4B:
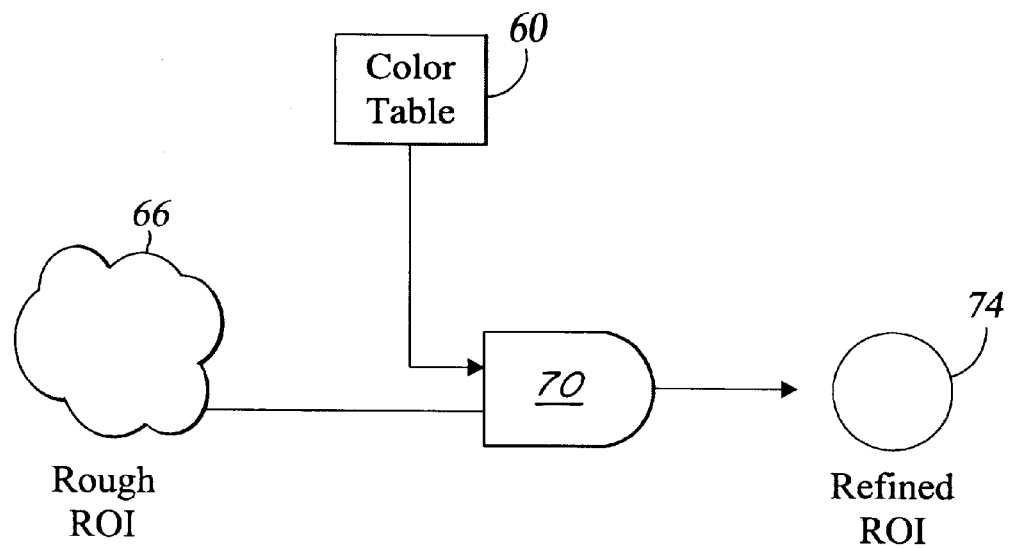
FIG. 4B is a schematic illustrative depiction of the manner in which color values stored in the color table are combined with a region of interest generated by the detection stage of FIG. 3 in accordance with the teachings of the present invention.

The foregoing detection stage 50 hence compares the rough ROI with the contents of the color table 60, performs selected erosion and dilation operations to obtain the pixels associated with the face (by analyzing chrominance values), and ultimately refines the ROI based on the contents of the color table 60. The entire operation is illustratively shown as a logic operation in FIG. 4B. Specifically, the detection stage 50 inputs data associated with the blob or rough head ROI 66 generated by the blob detection stage 56 to one input terminal of an AND gate 70. The color table 60 is coupled by communication pathway 64 to the other input of the AND gate 70. The illustrated gate 70 performs a logic operation on the inputs and generates an output image that corresponds to the overlap of identical data values at the input. This operation serves to refine the rough ROI. The rough ROI is tightened or made smaller than, or maintained approximately the same size as the rough ROI, since the flesh tone colors that exist in the ROI and which match the stored color values in the table 60 are retained, while colors in the ROI that are not stored in the table 70 are discarded. Hence, the ROI is processed to produce a refined ROI 74 that more closely resembles the person's head. Those of ordinary skill will realize that the foregoing logic operation is merely exemplary of the refinement feature of the invention, and can be implemented in software as well as hardware.

A significant advantage of employing the motion detection stage 54 and the color table 60 in defining the ROI corresponding to the head is that these features can be performed in real-time, since there is generally no processing and hence time cost associated with employing the motion detection and color features of the detection stage 50. Specifically, the motion detection stage 54 determines motion within the field of view prior to the system actually needing to utilize the acquired image information. For example, a person initially entering the field of view in a secured area generally does not require immediate access to the secured facility. In the meantime, the system 50 detects motion, blobs together pixels that roughly correspond to the person's head, and then refines this ROI using pre-stored flesh tone colors according to the above techniques. This is performed in real-time, with minimal processing cost and inconvenience to the person. Additionally, refining the ROI allows the system to more quickly and accurately locate an object, such as the eyes, within the ROI, since the ROI has been closely tailored to the actual size of the hand of the person.

Figure 5:
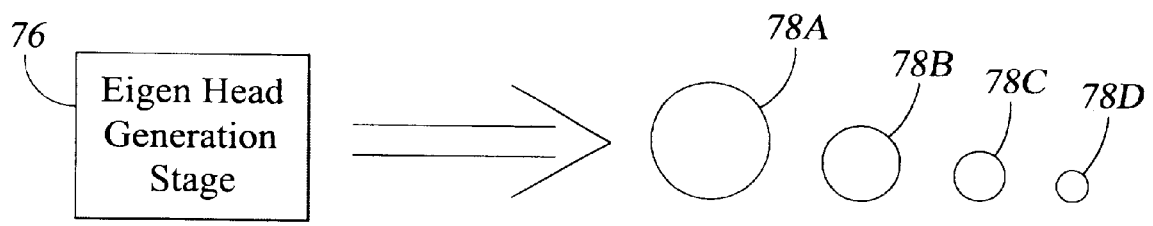
FIG. 5 is a schematic depiction of the scaling and low resolution eigenhead feature of the present invention.

With reference to FIGS. 3 and 5, the detection stage 50 can also define the head ROI when the system first detects motion followed by subsequent frames where no motion is detected, that is, when the object or person within the field of view is immobile, or the acquired image data is static. This may occur when a person originally enters the field of view and then immediately stops moving. The illustrated detection stage 50 includes an eigenhead generation stage 76 that generates eigenvectors that correspond to a head using PCA theory and techniques. Specifically, the eigenhead stage 76 initially samples a reference set of individuals and performs a PCA operation thereupon to generate a series of eigenheads that define the distribution of heads within a multi-dimensional image space. The eigenheads employed by the present invention are preferably low resolution eigenheads, such as between about 17×17 pixel and about 64×64 pixel resolution, and preferably about 21×21 pixel resolution, since a rough size match rather than intricate feature matching is all that is required to quickly define the ROI. An advantage of employing low resolution eigenheads is that they are relatively fast to process.

The eigenheads generated by the eigenhead stage 76 are further scaled to various sizes, illustrated as head sizes 78A–78D, to enable a complete and accurate correlation match. Specifically, the ROI is searched using an eigenhead (e.g., with eigenhead 78A) of a particular size as a windowing function, and the system determines if there is a sufficiently high correlation match. If no match is found, then the eigenhead is scaled downward, for example, to eigenhead size 78B, and again the motion ROI is searched with this eigenhead template. This process is repeated until a match is found. If none is found, then the eigenhead templates are scaled upwards in size. Hence, the detection stage 50 employs a multi-scale correlation technique to identify a ROI corresponding to a person's head by searching the ROI with a variable-sized eigenhead template to determine if there is a correlation match.

Figure 6:
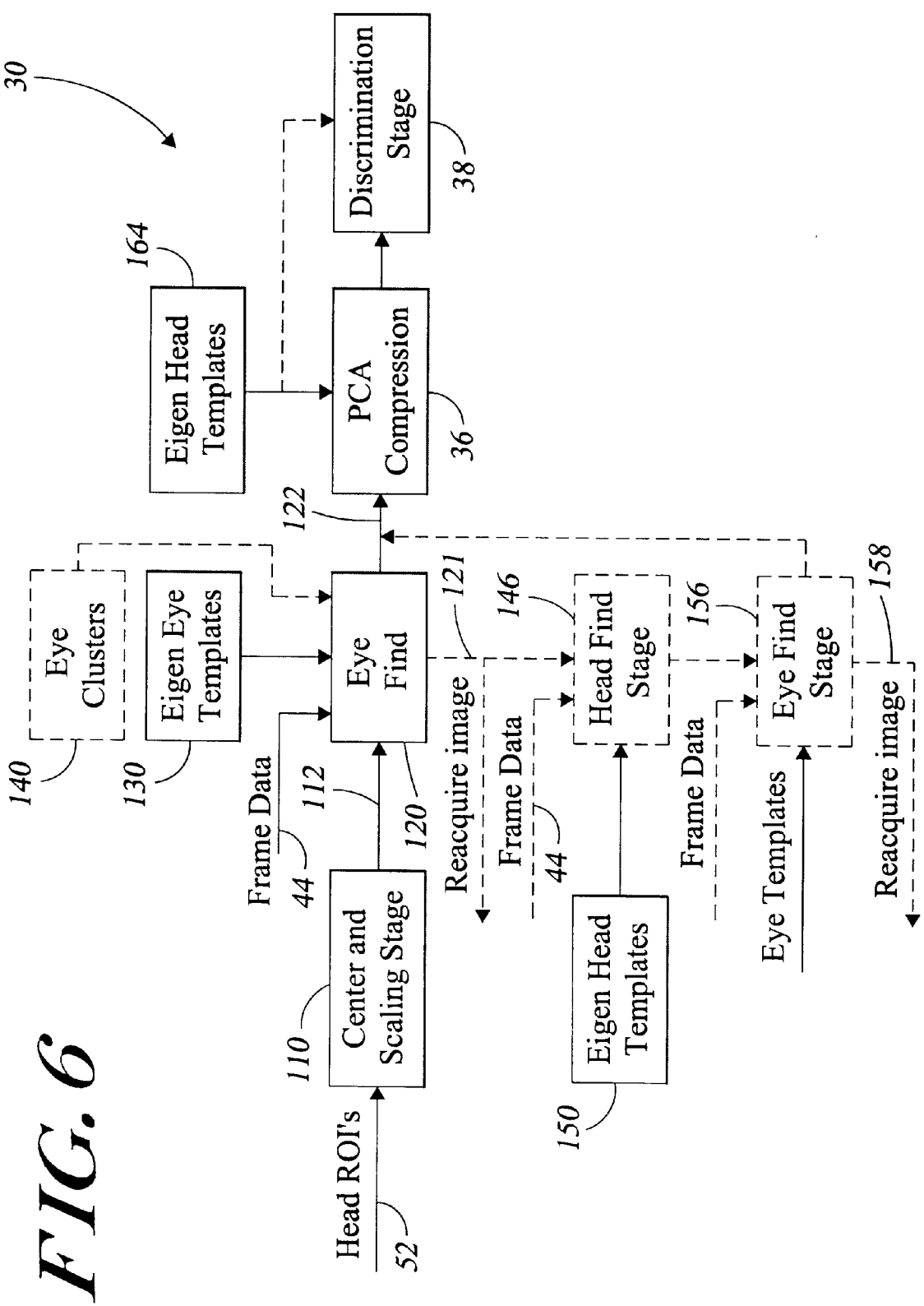
FIG. 6 is a more detailed schematic block diagram depiction of the real time facial recognition system of FIG. 1 according to the teachings of the present invention.

FIG. 6 is a more detailed schematic representation of the primary eye find stage 30 of FIG. 1. As described above, the output of the detection stage 50 is a series or list of ROIs corresponding to a person's head (head ROI). The ROI is passed through a head center and scaling stage 110 that centers and scales the ROI for subsequent use. Specifically, the center and scaling stage 110 determines the coordinates of the center of the region of interest. The head center coordinates can be determined by calculating the mean value of the contours of the ROI. The size of the head ROI is estimated as the mean distance from the head center to the contour edges of the ROI. This information is useful for determining the approximate location of the eyes within the ROI, since the eyes are generally located within a rough geometrical area of the overall head ROI.

The output signal 112 generated by the center and scaling stage is communicated to a first eye find stage 120 which comprises part of the overall identification system 20 and specifically the primary eye find stage 30. The first eye find stage 120 is adapted to receive a number of input signals carrying a variety of different image data or information. In particular, the frame data signal 44 generated by the frame grabber 26 is received by the first eye find stage 120. Additionally, an eigeneye template module 130 generates and stores a number of eigenfeature or eigeneye templates corresponding to a reference set of images. The eigeneye templates can be constructed in known fashion, the general construction of which is described in further detail below. The eigen template module generates an output signal that is also received by the first eye find stage 120.

Figure 7A:
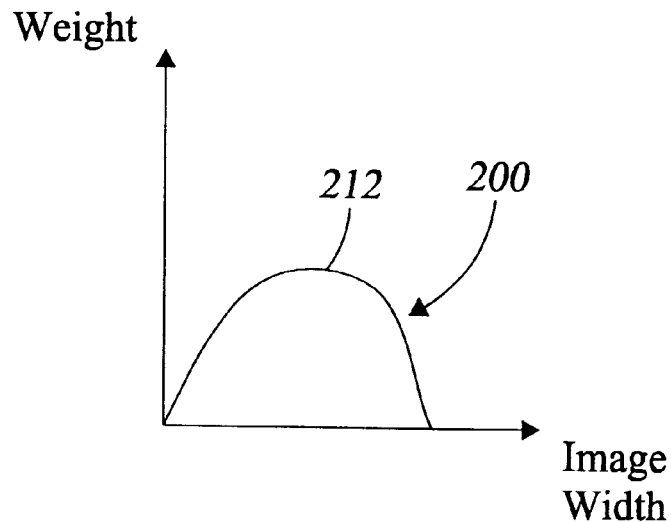
FIGS. 7A through 7C illustrate various embodiments of a center-weighted windowing functions employed by the facial recognition system according to the teachings of the present invention.
Figure 7B:
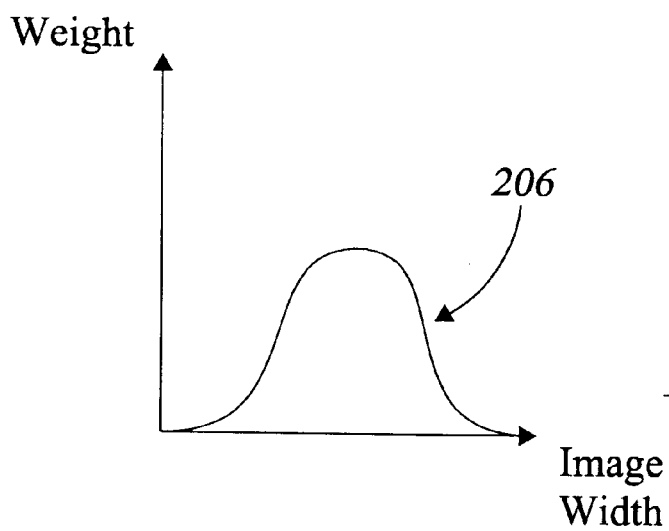
Figure 7C:
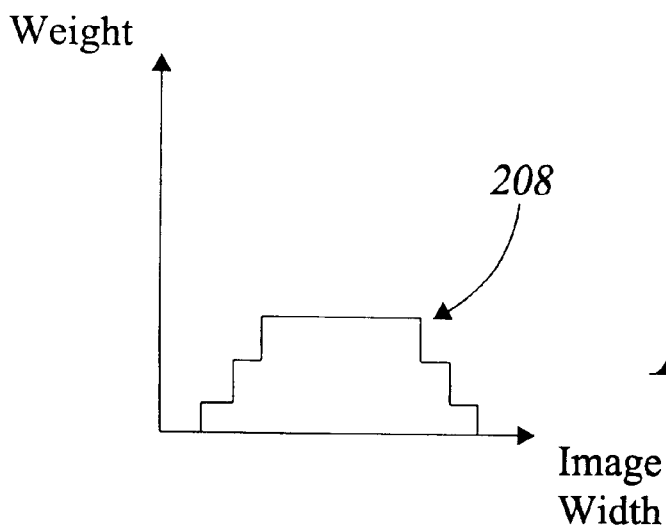

Additionally, the eigeneye template module 130 and preferably the first eye find stage 120 employs a selected weighting profile, or windowing function, when correlating the ROI with the eigeneye templates. In particular, the system 20 employs a center-weighted windowing function that weights image data more strongly in the middle portion of the image while conversely weighting data less strongly towards the outer regions of the image. FIGS. 7A through 7C illustrate exemplary weighting profiles 202, 206, 208 employed by the eye find stage 30 of the invention. FIG. 7A graphically illustrates one such weighting profile, and defines image data width along the abscissa, and normalized data weight along the ordinate. The illustrated weighting profile 200 has a sinusoidal-shape and is employed by the present invention as a window function. The function weights image data in a central region 202 of the window more strongly than image data at the edges of the image. Hence, the system accords the most weight to image data that has the highest percentage chance of being incorporated into the eigen template during production of the same. Conversely, the weighting profile accords less significance, and preferably little or no significance, to image data located at the boundary regions of the image. This center-weighting window function ensures that the system maximizes the incorporation of essential image data into the correlation, while consistently minimizing the chance that unwanted extraneous information is employed by the system.

The system 20 places the window function over a selected portion of the ROI, and then analyzes the ROI using this window function. The window function shape thus defines that selected portion of the image to be analyzed by the system of the invention. The illustrated sinusoidal-shape of the window function 200 thus weights more heavily data corresponding to the portion of the ROI that overlaps with the center portion of the function relative to the outer boundaries of the function. The use of a center-weighted window function enables the system 20 to avoid incorporating unwanted image data into the eigen template. The image data may be accidentally corrupted when employing conventional window functions by including unwanted data associated with adjacent facial features, shading, and other illumination perturbations. The system avoids incorporating this unwanted data into the eigentemplates, thereby minimizing the likelihood of the system generating false matches.

The significance of the window function shape employed by the identification system 20 of the present invention can be further illustrated by a simple example. For instance, eigenfaces can be created from a reference set of images in accord with PCA principles described in greater detail below. One or more features of the acquired facial images can be utilized to form selected eigentemplates of a particular facial feature. In one example, eigenvectors corresponding to eyes, and thus called eigeneyes, can be created from the reference images forming part of the reference set. Variations among eyes are prevalent in the reference set of images because of the various people that constitute the reference set. Additional factors, however, influence the random variations of the reference images. For example, if a particular individual's image was captured while the person was wearing eyeglasses, the system may inadvertently include data associated with the eyeglass frame and other glassware components when generating the eigenface. If a standard weighting profile where image data is valued equally thereacross were employed to analyze data corresponding to areas surrounding each eye, the eye portion of the image may include information corresponding to the eyeglass frame. As is obvious to one of ordinary skill, this additional information corrupts the overall acquired image data, and when projected onto the image space, may actually distort the spatial location of the eye within this image space. Specifically, the eye may be spatially shifted right or left, thus destroying the true spacing between eyes as well as the particular orientation of the eye relative to other facial features. Since this information is utilized by the system to generate templates, which themselves are employed to identify matches with a newly acquired image, the system could be prone to false matches.

FIGS. 7B and 7C illustrate yet other examples of weighting profile shapes that can also be employed by the eye find stage 30 of the present invention. In particular, FIG. 7B illustrates a bell-curve type weighting profile 206 that also accords stronger weight to a middle portion of the image as opposed to the peripheral or boundary regions. Likewise, the step function 208 further accords, in a stepwise fashion, more weight to image located within the interior regions of the image as opposed to the outer regions. Those of ordinary skill will readily recognize that other possible window shapes can be employed by the system 20 without departing from the spirit and scope of the invention.

An advantage of employing the eigeneye templates in the eye find stage 120 is that PCA projections in image subspace require little or no processing time, and thus are simple and efficient to use in facial reconstruction systems. Since the Eigenface method is based on linearly projecting an image onto multi-dimension image space, this method yields projection directions that maximize the total scatter across all the facial images of the reference set. The projections thus retain unwanted variations due to lighting and facial expression. This scatter can be greater than the conventional scatter that is produced in the projections due to variations in face identity. One method to overcome this scatter is to include in the reference set a number of different images that mimic the continuum of lighting conditions in order to more evenly distribute points in the image space. These additional images, however, could be costly to obtain and require significant intrusions on the reference people. Furthermore, analyzing and manipulating this additional data becomes significantly cumbersome and computationally burdensome. One technique to address the scatter in the eigenimages is to correct for the variations in lighting and expression during the image manipulation stage 34 or during any other convenient stage of the illustrated facial recognition system 20.

Those of ordinary skill will recognize that a correlation in the Eigen approach is a nearest neighbor classifier scheme in image space. For example, a new image (e.g., the ROI) can be classified (recognized) by assigning to it the label of the closest point in the reference set, as measured in the image space. Since all of the images are normalized to have zero mean and unit variance, classifying the nearest match is equivalent to correlating the new image with each image in the reference set to determine the closest match. This correlation can be performed using the traditional Eigen approach, or can be performed by calculating the eigen coefficients using a fast fourier transform (FFT) approach to generate a correlation map. According to a preferred practice, the system 20 employs the FFT approaching the eye find stage 20, and specifically to any selected input to the head find stage 28 or the eye find stage 158 to perform the correlation between the newly acquired image and one or more reference images.

One example of employing this FFT approach is as follows. The input image is initially acquired and digitized, and then processed by the detection stage 50. Having captured a static image of interest by the techniques and methods previously and hereinafter described, the image (e.g., frame data and/or eigeneyes) is reduced to a digital representation of pixel values. These pixel values correspond to the measure of the light intensity throughout the image. As an example, an image may be digitized to form a rectangular or square array of pixel values which are indicative of the light intensity within the image. For example, a facial image can be reduced to N rows by M columns of pixel data resulting in an aggregate of N×M pixel values. Each of these pixel values can be identified as to location by row and column. Consequently, it is natural to represent the digitized image as a discrete function of luminescence or light intensity that varies by pixel location. Such a function is represented as $I(x_i, yj)$ where $x_i$ designates a row of pixel locations and $y_j$ identifies a column of pixel locations, thus identifying an individual pixel within the image.

In certain image processing applications, it is desirous or necessary to identify or recognize a distinctive object (ROI) or feature within the larger image. For example, in a security application, it may be necessary to identify an individual's face from a larger reference set of faces of individuals authorized to access a secured location. Conventionally, this has been accomplished by storing a digital representation of the face of each authorized individual in a vector or matrix representation. The digitized facial image of the person requesting access to the secured resource is then matched against the set of reference faces authorized for access to the resource in order to determine if there is a match. The matching process has conventionally been performed by a mathematical correlation of the digital pixel values representing the face of the individual requesting access with the pixel values of the faces from the reference set. In mathematical terms the correlation is represented by the value $$\sum_{i=1}^{N}\sum_{j=1}^{N} I(x_i, y_i) I_R(x_i, y_i) \qquad \text{(Eq. 7)}$$

where $I(x_i, y_j)$ is the luminescence value for the facial image to be detected at each of the pixel values and $I_R(x_i, y_j)$ is the corresponding facial image from the reference set. The correlation is performed for each image from the reference set. It is well known that a good match of digital data is represented by a large correlation value, and thus the reference image with the greatest correlation is considered the best match to the image to be detected. A predetermined thresholding value is set so as to ensure that the match is sufficiently close. If all the calculated coefficient values are below the threshold value, it is presumed that the detected face or feature is not found in the matching reference set.

Since the object or feature to be identified may comprise only a subset of the larger image, the images from the reference set must be correlated over all possible subsets of the image in order to detect the object or feature within the larger image. Using the previous security example, the face to be identified or detected may exist within a background of unrelated objects, and also positioned at almost any location within the larger image. Thus, the reference faces are correlated with all possible subsets of the image to find and to identify the face to be matched.

While the techniques described above can be used to calculate a correlation value, they are computationally slow and processor intensive. For example, if an image of 320 pixels×640 pixels is to be compared against a set of reference images, at least 204,800 multiplications and additions must be performed for each referenced image to calculate the correlation values for that image. The magnitude of this computing requirement severely restricts the number of reference images in the reference set. Hence the system is severely limited in the number of images it can store in the reference set.

The methods and techniques of the current invention are advantageously employed using the concept of an eigenface basis to reduce this computational requirement. The face to be detected from a training or reference set of facial images can be defined by a mathematical relationship expressed as $I(x_i, y_i)$. Let the training or reference set of acquired face images be represented by $\Gamma_1, \Gamma_2, \Gamma_3, \ldots \Gamma_M$. The average face of this reference set is defined by $$\Psi = (M)^{-1} \Sigma_n \Gamma_n \qquad \text{(Eq. 8)}$$

where the summation is from n=1 to M. Each reference face differs from the average or mean face by a vector $\Phi_1 = \Gamma_1 - \Psi$. Thus, the mean is found by adding all the faces together in the reference set and then dividing by the number of face images. The mean is then subtracted from all the face images. A matrix is subsequently formed from the resultant mean adjusted faces.

This set of very large vectors associated with the reference faces is then subject to principal component analysis (PCA). The PCA establishes a set of M orthonormal vectors, $\mu_\kappa$, which best describe the distribution of face data within the face space. The kth vector, $\mu_\kappa$, is chosen such that:

$$\lambda_\kappa = (M)^{-1} \Sigma_n (\mu_\kappa^T \Phi_n)^2 \qquad \text{(Eq. 9)}$$

is a maximum, subject to:

$$\mu_1^T \mu_k = \delta_{1k} = \begin{cases} 1, & \text{if } 1 = \kappa \\ 0, & \text{otherwise} \end{cases} \qquad \text{(Eq. 10)}$$

The vectors $\mu_\kappa$ and scalars $\lambda_\kappa$ are the eigenvectors and eigenvalues, respectively, of a rather large covariance matrix $$C = (M)^{-1} \Sigma_n \Phi_n \Phi_n^T \qquad \text{(Eq. 11)}$$

It has been recognized that the contrast and brightness of each of the images in the reference set $\{\Gamma_i\}$ may differ significantly from each other and from the image to be matched. These differences may skew the matching results, and thus create errors in detection. The present invention compensates for these differences. Specifically, the image to be matched is adjusted relative to each image from the reference set before correlation is performed. The statistical mean and standard deviation of all the pixel values for the individual reference image are determined, and the pixel value of the image to be matched are adjusted according to the following rule:

$$I_s(x_i, y_j) = cI(x_i, y_j) + b; \qquad \text{(Eq. 12)}$$

where c and b are the respective standard deviation and mean from the image in the reference set, and $I(x_i, y_j)$ are the original pixel values in the image to be matched.

According to a further practice, a windowing function is defined that weights the product of the corresponding luminescence values according to their significance in detecting the object within an image. For example, if one were attempting to find an eye within a facial image, a windowing function can be defined to emphasize the correlation of certain aspects of the reference eye and to avoid the confusion associated with peripheral features such as eyeglasses. In one embodiment of the invention, the windowing function has a shape corresponding to the previously-described center-weighted windowing function that accords greater weight or significance to pixel values in the center of the windowing map and lesser or no significance to those on the edges of the map, as shown in FIGS. 7A, 7B and 7C. This windowing map may be employed with a two dimensional circular geometry. Pixel values outside the bounds of the windowing map have a weight of zero, and thus do not enter into the correlation calculation.

The specific details of detecting an individual face within a larger image is described mathematically using the above described eigenface concept. The foregoing discussion while focused on identifying an individual's face within an image, can also be used in a more general sense to identify the head of an individual, the eyes of an individual, or any distinctive feature within an image. The set of basis eigenfaces is simply changed to the basis of eigenheads or eigeneyes. In the following discussion x and y are considered vectors which in component form would be written as $(x_i, x_j)$ and $(y_i, y_j)$.

The system 20 initially defines w(x) to be a window function which is centered at x=0 and has unit power, $$\sum_{i=1}^{N} \sum_{j=1}^{N} w^2(x) = 1 \qquad \text{(Eq. 13)}$$

Let I(x) be the image to be analyzed, where I(x) is moved under the window function to analyze it. The effect of brightness and contrast variations in the part of the image under the window is to be minimized by scaling I(x) by a factor c, the standard deviation of the pixel values in the reference image undergoing analysis, and an additive constant b which is the mean of the pixel values in that reference image. Thus the family of images that result from contrast and brightness changes to image I(x) can be modeled as cI(x)+b which is expressed as $I_s(x)$.

To counter contrast and brightness variation, when $I_s(x)$ is shifted by an offset y, to cause w(x) to overlay different portions of the image, $I_s(x)$ maps to a new function p(x, y) that has zero mean and unit power. That is, $$\sum_{i=1}^{N} \sum_{j=1}^{N} p(x, y) w^2(x) = 0 \quad \text{and} \qquad \text{(Eq. 14)}$$

$$\sum_{i=1}^{N} \sum_{j=1}^{N} p^2(x, y) w^2(x) = 1 \qquad \text{(Eq. 15)}$$

These conditions require that $$p(x,y)=[I_s(x-y)-m(y)]/s(y) \quad \text{(Eq. 16)}$$

where $$m(\underline{y}) = \sum_{i=1}^{N}\sum_{j=1}^{N} I_s(\underline{x}-\underline{y})w^2(\underline{x}) \quad \text{and} \quad \text{(Eq. 17)}$$

$$s(\underline{y}) = \left[\sum_{i=1}^{N}\sum_{j=1}^{N}[I_s(\underline{x}-\underline{y})-m(\underline{y})]^2 w^2(\underline{x})\right]^{0.5} \quad \text{(Eq. 18)}$$

$$= \left[\left(\sum_{i=1}^{N}\sum_{j=1}^{N} I_s(\underline{x}-\underline{y})w^2(\underline{x}) - 2m(\underline{y})\right)\right.$$

$$\left.\left(\sum_{i=1}^{N}\sum_{j=1}^{N} I_s(\underline{x}-\underline{y})w^2(\underline{x}) + m^2(\underline{y})\right)\left(\sum_{i=1}^{N}\sum_{j=1}^{N} w^2(\underline{x})\right)\right]^{0.5}$$

$$= \left[\sum_{i=1}^{N}\sum_{j=1}^{N} I_s^2(\underline{x}-\underline{y})w^2(\underline{x}) - m^2(\underline{y})\right]^{0.5}$$

Note that for any value of c and b, c I(x)+b map to the same function p(x,y).

The function p(x,y) can be described in terms of its coefficients with respect to a set of eigen basis functions $\mu_\kappa(x)$. These coefficients, which are designated as $\Omega_\kappa(Y)$, are defined as the inner products. The basis functions are computed from the set of reference images $\Gamma_i$ that were properly aligned so that the feature of interest (e.g., the face to be identified) is centered at the zero point in every reference image, and the eigenfaces previously described are represented as:

$$\Omega_i(\underline{y}) = \sum_{i=1}^{N}\sum_{j=1}^{N} p(\underline{x}-\underline{y})\mu_k(\underline{x})w^2(\underline{x}) \quad \text{(Eq. 19)}$$

$$= \left[\left(\sum_{i=1}^{N}\sum_{j=1}^{N} I_s(\underline{x}-\underline{y})\mu_k(\underline{x})w^2(\underline{x}) - m(\underline{y})\right)\right.$$

$$\left.\left(\sum_{i=1}^{N}\sum_{j=1}^{N} \mu_k(\underline{x})w^2(\underline{x})\right)\right]/s(\underline{x})$$

For convenience, we will also stipulate that $$\sum_{i=1}^{N}\sum_{j=1}^{N} \mu_k(\underline{x})w^2(\underline{x}) = 0 \quad \text{(Eq. 20)}$$

This gives $$\Omega_k(\underline{y}) = \left[\sum_{i=1}^{N}\sum_{j=1}^{N} I(\underline{x}-\underline{y})\mu_k(\underline{x})w^2(\underline{x})\right]/s(\underline{y})$$

The weights $\Omega_\kappa$ form a vector $\Omega^T=[\Omega_1\Omega_2\ldots\Omega_m]$ describing the contribution of each eigenface in representing the new input face image, thus treating the eigenfaces as a basis for the face images.

The foregoing vector can then be used in a standard pattern recognition algorithm to determine which of the faces from the reference set, if any, best matches the unknown face. The simplest method for determining which face class provides the best description of an input face image is to find the face that has a representation in terms of the eigenface basis vectors with a minimum Euclidean distance between the coefficients, $\epsilon_\kappa=\|\Omega-\Omega\kappa\|^2$.

Figure 8:
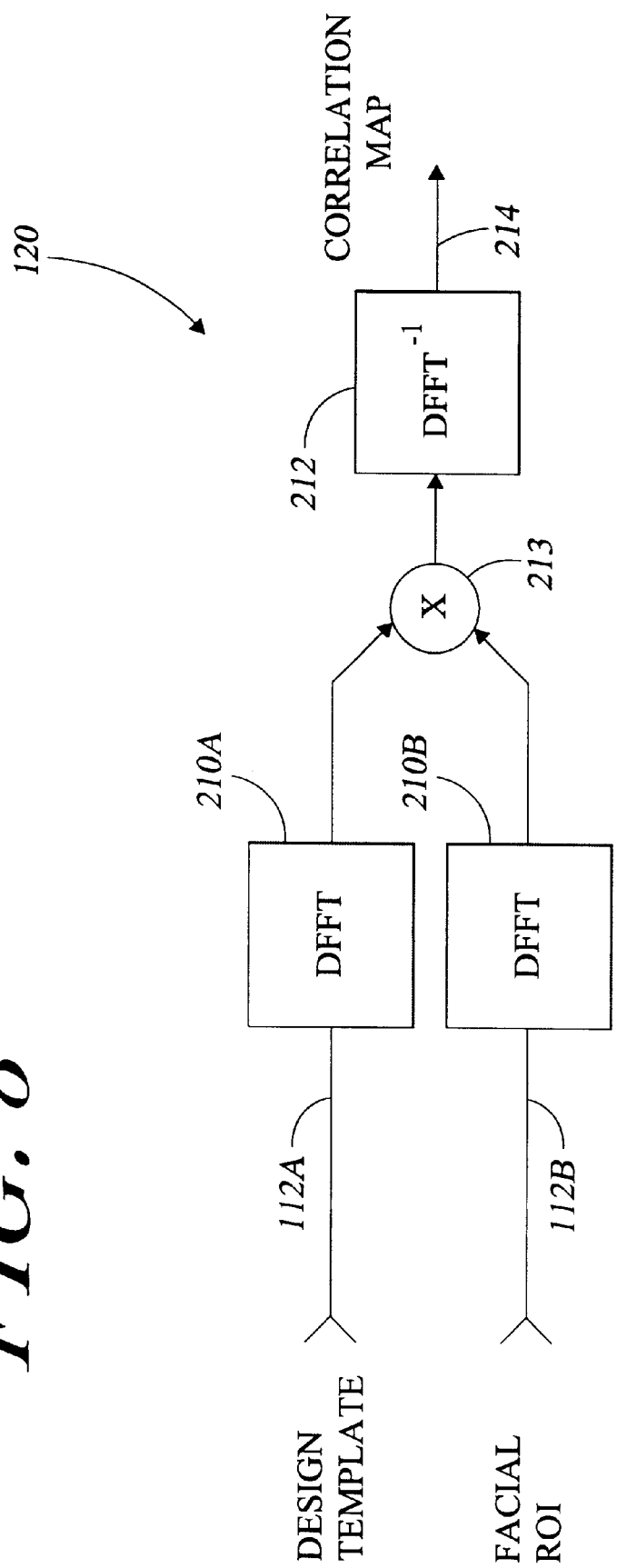
FIG. 8 is a block diagram depiction of the fast fourier transform stage for generating a correlation map.

FIG. 8 is a schematic block diagram depiction of the eye find stage 120 which can employ, among other things, the Discrete Fast Fourier Transform (DFFT) approach described above. Specifically, the eye find stage 120, for example, can employ DFFT procedures to correlate the ROI with the eigen template, such as the eigeneye templates, to produce a correlation map. It has been realized that the expressions for the correlation may be calculated in a more efficient fashion using an DFFT approach. Specifically, the expressions may be computed by transforming the calculation to the frequency domain, and then performing an inverse transform operation to obtain the result in the spatial domain. It has been realized that the sum of products in the space domain is equivalent to the product of the DFFT in the frequency domain. An inverse DFFT transform of this product then produces the required result. By transforming the computation into the frequency domain, the inherent efficiency of the DFFT can be utilized to significantly reduce the overall number of calculations required to obtain the results.

According to one practice, the eye find stage 120 receives a template 112A from the eigeneye template stage 130. The eye find stage 120 employs one or more transform stages 210A and 210B to convert the eigen templates and the ROI signal 112 into the frequency domain to reduce the amount of computations necessary to produce the correlation map 214. The DFFT stages 210A, 210B reduce the amount of computations since rather than constructing a map by summing the products of the templates and the ROI, the eye find stage 120 of the invention merely acquires the dot product, in the frequency domain, of the input signals by transforming the image and template into the frequency domain. The converted data is then multiplied by the multiplier 213 to perform the foregoing dot product. The eye find stage 120 then reconverts the data into the spatial domain be employing the inverse transform stage 212. The stage 120 hence generates a correlation map identical to that generated employing the conventional spatial technique, without manipulating large, complex equations. Hence, the system is faster, more responsive to input image data, and is capable of generating correlation maps in real-time.

Figure 9:
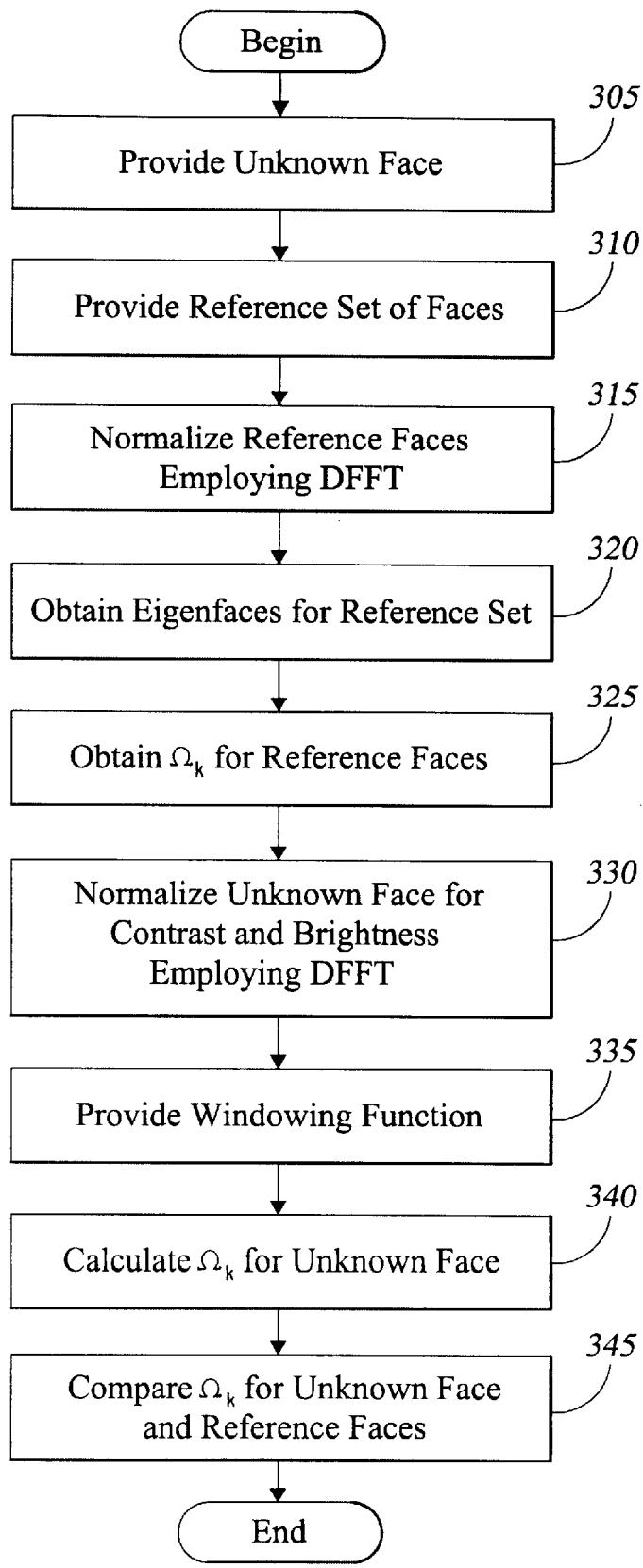
FIG. 9 is a flow-chart diagram illustrating the generation of the eigenfaces by employing a dot product in accordance with the teachings of the present invention.

FIG. 9 is a schematic flowchart diagram illustrating the operations employed to identify an individual face within a larger image. The system first generates a digitized image consisting of a face that is to be matched to a particular face in a reference set of stored faces, as set forth in steps 305 and 310. Each face within the reference set of faces is then normalized and converted into the frequency domain using the DFFT 210A, and a set of basis vectors (e.g., eigenfaces or eigeneyes), $\mu_\kappa$, that span the set of known reference faces is obtained employing conventional Eigen techniques. This is set forth in steps 315 and 320.

According to step 325, the system then obtains the component coefficients $\Omega_\kappa$ in terms of the basis vectors $\mu_\kappa$ for each face within the reference set of faces by employing a dot product operation. This can be performed in the eye find stage 120. As illustrated, the stage 120 receives the centered and scaled ROI and an eigen eye template from the template stage 130. The eye find stage can employ a program or hardwired system that converts the eigeneye data into vector coefficients in the frequency domain. The resultant operation forms a vector $\Omega=(\Omega_1,\ldots,\Omega_M)$ of component coefficients for each face in the reference set.

The system then normalizes the unknown facial image, as set forth in step 330, for contrast and brightness for each reference image, and converts the normalized image data into the frequency domain using DFFT210B. The system then defines a windowing function of the type described above (e.g., center-weighted function) to emphasize selected local features or portions of the image. This is set forth in step 335. The system then overlays the image on the windowing function, and calculates a set of component coefficients Ω for the unknown image in terms of the eigenfaces $\mu_K$ using a dot product operation, step 340. Finally, as set forth in step 345, the system compares the component coefficients Ω of each face from the reference set with the coefficients of the unknown image to determine if a match exists.

The illustrated system 20 thus provides an integrated real-time method of detecting an individual face within an image from a known reference set of faces by converting the template and ROI data into the frequency domain, obtaining the dot product, and then reconverting the data into the spatial domain to develop a correlation map. One of ordinary skill in the art will readily recognize that while the method and techniques employed are described in terms of a face detection application, the advantages and benefits of the invention are not limited to this application. In general, the invention can be used to advantage in any application with the need to identify or detect an object or feature within a digitized image, such as a head or eyes of an individual. Moreover, in the most general application of the invention, a known data structure or pattern of digital data from a reference set of such data structures can be identified within a larger set of digitized values.

In an alternate embodiment, the system can also input data associated with eye clusters generated by the eye cluster stage 140. The Eye cluster stage 140 logically organizes a reference set of eye images into clusters in order to develop templates that used by the eye find stage 120 to locate the eyes. Specifically, as described above, the eye find stage 120 compares the centered ROI with the eye cluster template to determine the existence of a match. Those of ordinary skill will readily understand the use of eye clusters, and in accordance with the teachings of the present invention, how they are implemented by the present system to locate a region in the ROI.

Referring again to FIG. 6, the eye find stage 120 receives the original image frame data 44 and the ROI that has been scaled and centered by the scaling stage 110, and performs a correlation match with the eigen eye templates and windowing function to determine the eye locations within the image. As set forth above, this correlation can be performed in the spatial or frequency domain. If the eye find stage 120 produces a sufficiently high correlation, and thus locates the eyes within the image, the stage generates an output signal 122 that is indicative of eye locations, and which is received by the compression stage 36.

When the first eye find stage 120 is unable to determine the eye location, the system 20 reverts to a backup technique that employs the second head find stage 146 and the second or back-up eye find stage 156. In particular, the first eye find stage 120 generates an output signal 121 that serves to actuate the frame grabber 26 to re-acquire an image, while concomitantly generating an input signal for the head find stage 146.

Similar to the first eye find stage 120, the second head find stage 146 receives the original frame data 44, the eye find stage output signal 121, as well as eigenhead templates stored in the eigenhead template stage 150. The eigenhead templates are generally low resolution eigenheads produced by the foregoing Eigen technique. The second head find stage 146 performs a correlation match employing the eigenhead templates stored in the eigenhead stage 150, and which correspond to the previously captured region of interest. Assuming there is a match at this stage, the system 30 produces an output signal which actuates a second eye find stage 156, which receives signals similar to the first eye find stage 120, to again attempt to locate the eyes. If the system fails the second time to determine the eye locations, the system produces an output signal 158 which actuates the frame grabber 26 to reacquire an image. The redundant head and eye find stages 146 and 156 increase the eye location accuracy of the system. Those of ordinary skill will recognize that there is a tradeoff between accuracy and time when determining whether a newly acquired image matches a pre-stored image. The illustrated system 20 attempts to balance these competing concerns by opting for the fast, real-time initial approach of locating the eyes with the first eye-find stage 120. If this fails, however, the system employs the head find and eye find stages 146 and 156 in order to improve the overall accuracy of the system.

Figure 10:
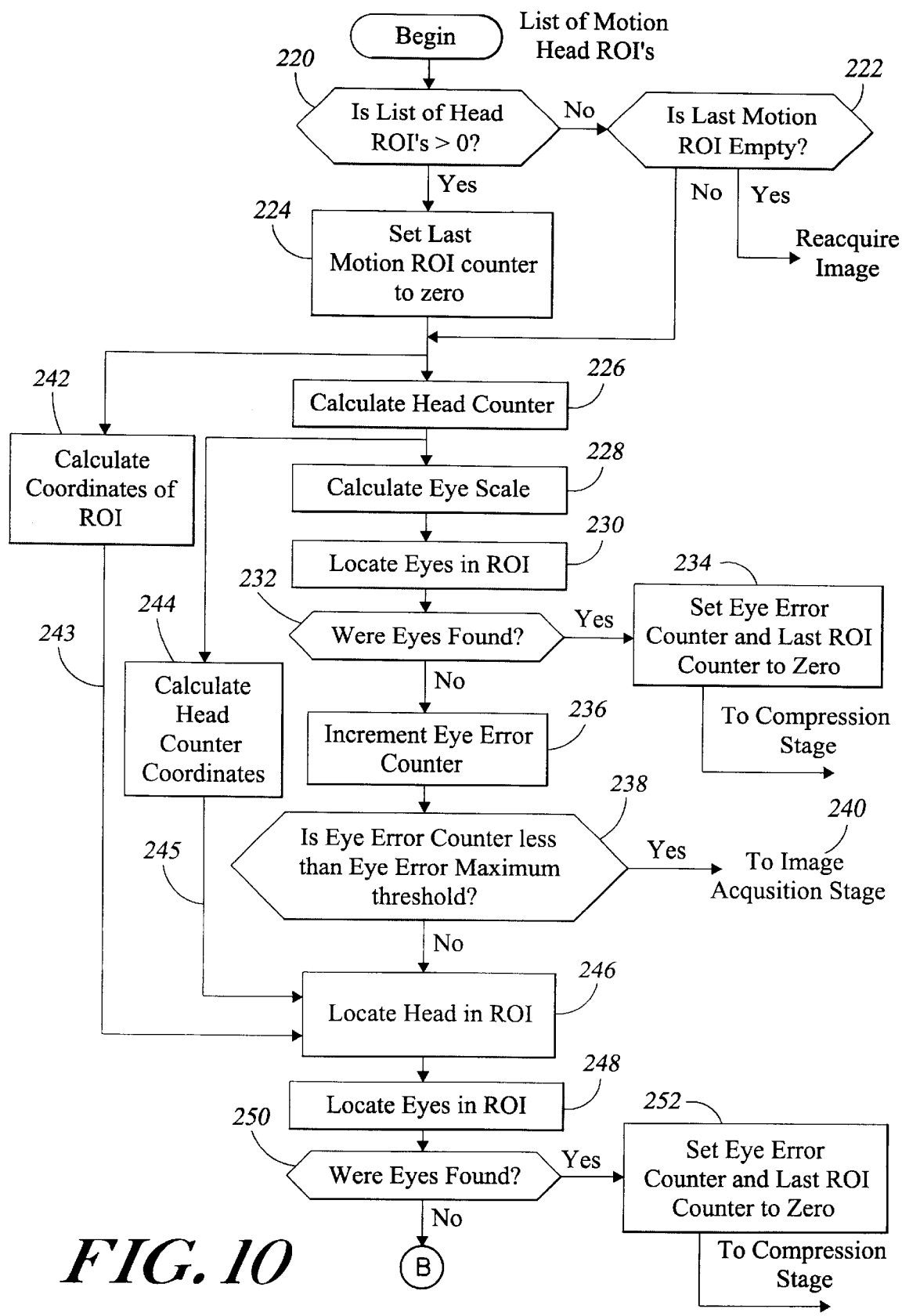
FIGS. 10 and 10A are flow-chart diagrams illustrating the acquisition and determination of a selected region of interest by the facial recognition system according to the teachings of the present invention.
Figure 10A:
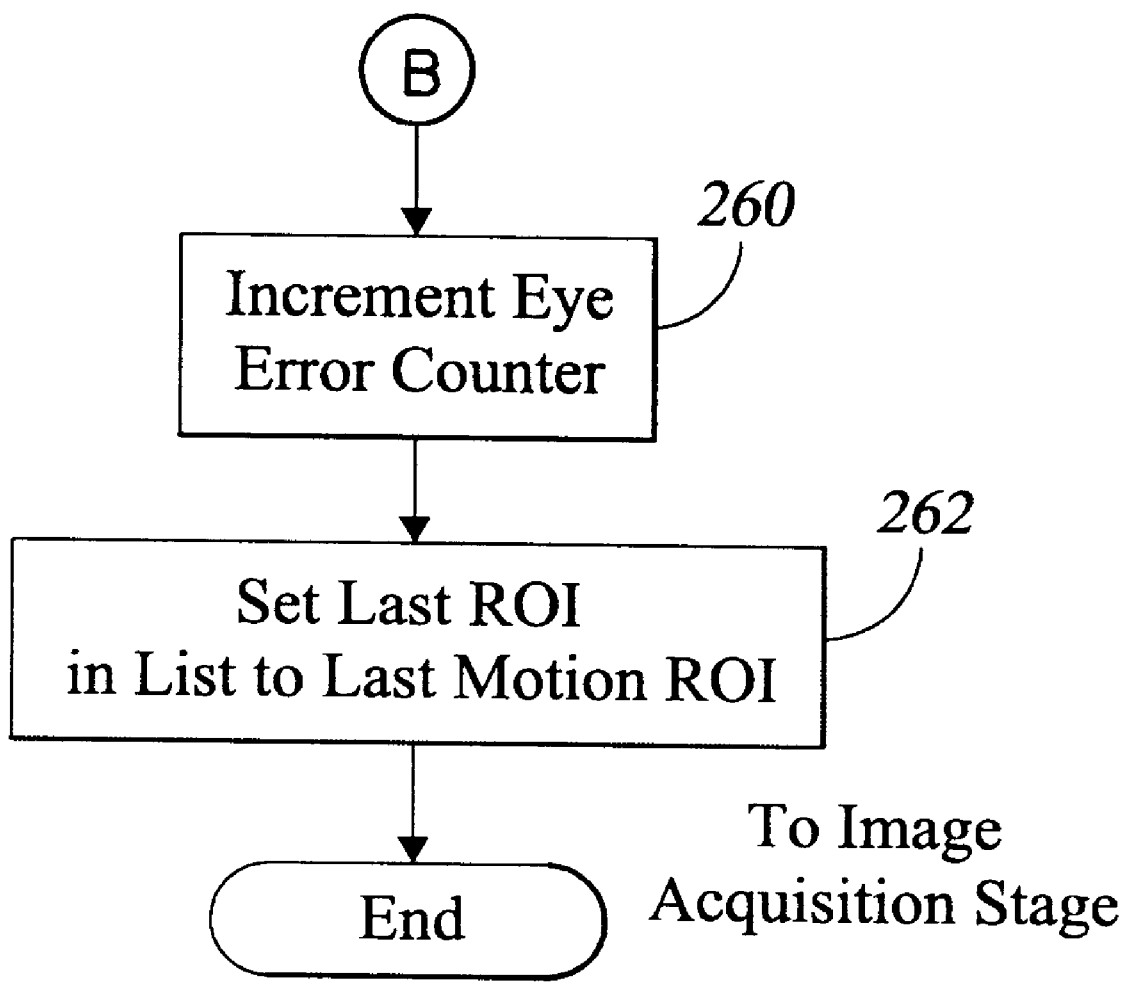
Figure 11:
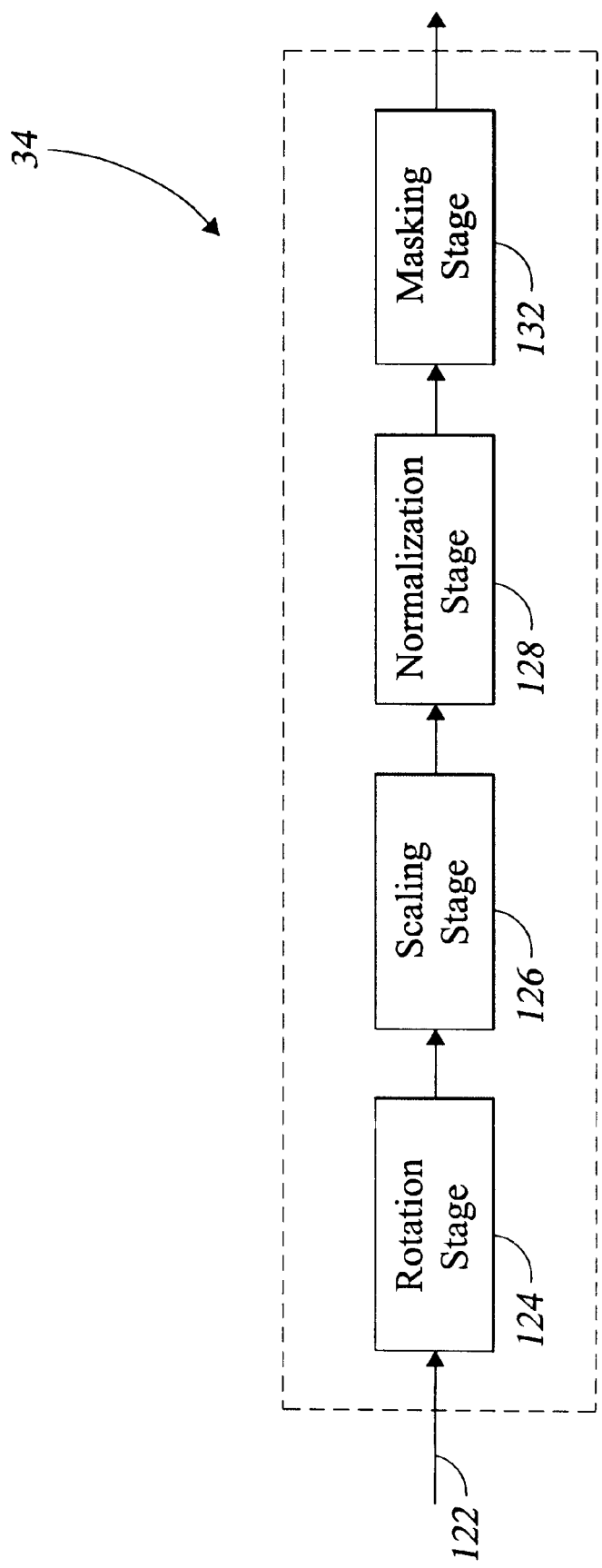
FIG. 11 is a more detailed schematic block diagram depiction of the image manipulation stage of FIG. 1 in accordance with the teachings of the present invention.

The operation of the primary eye find stage 30 of FIGS. 1 and 6 is further illustrated in the flow chart schematic diagrams of FIGS. 10 and 10A. In particular, the head ROIs produced by the detection stage 50 of FIG. 3 serve as the input to the primary eye find stage 30 of FIG. 6. The system then determines if the number of ROIs within the image are greater than zero. This is determined in step 220. If the number is greater than zero, the system sets a motion ROI counter to zero, as set forth in step 224, and then proceeds to further process the ROI. Conversely, if the system determines that the number of head ROIs is not greater than zero, then the system determines whether the last ROI is devoid of appropriate image data, as set forth in step 222. If the image is devoid of image data, then the system actuates the image acquisition device 22 and frame grabber 26 to reacquire an image. If not, then the system proceeds to step 226, as set forth below.

After the system 20 determines that the last motion ROI contains data by setting the motion ROI counter to zero, the system calculates the head center within the image, as set forth in step 226. The system then proceeds to calculate the appropriate eye scale step 228, and then locates the eyes in the region of interest ROI, step 230. As set forth in step 232, if the system determines that the eyes in the ROI were located, then an eye error counter and the last motion ROI counter are set to zero, thus signifying that an accurate eye location operation has occurred. This is set forth in step 234. The system then passes the eye location image information onto the compression stage 36.

If the eyes were not successfully located, the system, as set forth in step 236, increments the eye error counter to signify that an error has occurred while attempting to identify or locate the eyes within the head ROI. The system 20 then reverts to a backup head find stage 146 and second eye find stage 156 to locate the eyes. In particular, the system once again locates the head in the region of interest, as set forth in step 246. This particular step is in feedback communication with two particular feedback loops 242 and 245. As illustrated in FIG. 8, the system calculates the spatial Cartesian coordinates of the ROI, as set forth in step 242. This step occurs after the motion counter has been set to zero in step 224. Additionally, the system calculates the head center coordinates, step 244, and which occurs after step 226. After the system locates the head for the second time in the ROI, as set forth in step 246, the system then attempts to locate the eyes. If the eyes are located this time, the system 20 proceeds to set the eye error counter and the last ROI counter to zero, as set forth in step 252 (similar to step 234). The eye location information is then transferred to the compression stage 36.

If the system again fails to locate the eyes, the error counter is once again incremented, as set forth in step 260, to signify that an additional eye location failure has occurred. The system then proceeds to set the last ROI in the list to a value equal to the last motion ROI, as set forth in step 262. Once the counter is set to a value corresponding to the last ROI, the system resets itself to accommodate additional ROI information generated by the detection stage 50. The system then repeats the entire process.

With further reference to FIG. 6, the eye location image data 122 is then transferred to the compression stage 36. Those of ordinary skill will recognize that prior to receipt of the eye location information by the compression stage 36, the information passes through an image manipulation stage 34, as set forth in FIGS. 1 and 10. The eye location information can initially pass through a rotation stage 124 which seeks to rotate the image information to a selected orientation to enable an accurate and appropriate comparison with prestored images. The rotated image data is then scaled by the scaling stage 126 to an appropriate size, and then normalized by the normalization stage 128 to attain a normalized image suitable for processing by the compression stage. Image data information not associated with the eyes is then masked, or removed, by the masking stage 132. The rotation stage 124, scaling stage 126, normalization stage 128, and masking stage 132, all employ conventional processes that are readily apparent to one of ordinary skill in the art.

The eye location information is then transferred to a compression stage 36 where an Eigen procedure is performed on the data. This procedure is performed, in one embodiment, by first obtaining a training reference set of faces by acquiring a number of reference images. The training or reference set is normalized, as described above, so that all faces are the same scale, position, orientation, mean, and variance. The actual encoding or compression process can employ a Karhunen-Loeve transformation or an eigenvector projection technique, which encodes an image of a person's face or other facial feature, such as nose, eyes, lips, and so forth, as a weighted set of eigenvectors. This eigenvector projection technique is described more fully in U.S. Pat. 5,164,992, entitled "Face Recognition System", issued to Turk et al., the contents of which are hereby incorporated by reference. As described therein, an image of a face is projected onto a face space defined by a set of reference eigenvectors. The reference set of eigenvectors, or eigenfaces, can be thought of as a set of features which together characterize the variation between face images within a reference set of facial images. This distribution of faces in the reference set of faces can be characterized by using principal component analysis to extract face information that characterizes the variations or differences between a newly acquired image (the projected image) and the eigenfaces. Principal component analysis (PCA) is a known technique. The resulting eigenvectors produced by performing the PCA define the variation between the face images within the reference set of faces, and can be referred to as eigenfaces. Thus, an eigenface is formed by multiplying each face in the training set by the corresponding coefficient in the eigenvector. Once the eigenfaces are identified an image signal can be represented as a function of these eigenfaces by projecting the image signal into the space defined by these eigenfaces.

The foregoing is a result of initially characterizing each face image I(x,y) as a two-dimensional image having an N by N array of intensity values (8-bit). When employed to produce eigenvectors, the face image can be represented in a multi-dimensional image space as a vector (or point) of dimension $N^2$. Thus, a typical acquired image of, for example, 256 by 256 pixels becomes a vector within this multi-dimensional space of 65,536, or equivalently, a point in a 65,536-dimensional image space. A series of acquired images can thus be mapped to a series of points within this rather vast image space.

The creation of eigenfaces turns on the realization that different facial images are nonetheless similar in overall configuration, and are not randomly distributed in the foregoing image space. The images are thus located within a rather small region of this vast image space, or in a relatively low dimensional subspace. Using principal component analysis, one can identify the vectors which best account for the distribution of face images within the entire image space. These vectors, coined "eigenfaces", define the overall "face space" of this system. As previously set forth, each vector having a length $N^2$ describes an N by N image, and can be represented by a linear combination or concatenation of vector values of the original face images that constitute the reference set of images.

A portion of the mathematics associated with the creation of eigenfaces was previously described in Equations 8 through 11.

It is known that $C=(M)^{-1}\Sigma_n \Phi_n \Phi_n^T = AA^T$, where the matrix $A=[\Phi_1 \Phi_2 \ldots \Phi_M]$. The matrix C, however, is $N^2$ by $N^2$, and determining the $N^2$ eigenvectors and eigenvalues can become an intractable task for typical image sizes. Consequently, if the number of data points in the face space is less than the dimension of the overall image space, namely, if $M<N^2$, there are only M−1, rather than $N^2$, meaningful eigenvectors. Those of ordinary skill will recognize that the remaining eigenvectors have associated eigenvalues of zero. One can solve for the $N^2$ dimensional eigenvectors in this case by first solving for the eigenvectors of an M by M matrix, which is much smaller than the 16,384 by 16,384 matrix, and then taking appropriate linear combinations of the face images $\Phi_i$.

Consider the eigenvectors $v_i$ of $A^T A$ such that:

$$A^T A v_i = \mu_i v_i \quad \text{(Eq. 21)}$$

Premultiplying both sides by A, yields:

$$AA^T A v_i = \mu_i A v_i \quad \text{(Eq. 22)}$$

from which it is apparent that $Av_i$ are the eigenvectors of $C=AA^T$.

Following this analysis, it is possible to construct the M by M matrix $L=A^T A$, where $L_{mn}=\Phi_m^T \Phi_n$, and find the M eigenvectors, $v_1$, of L.

These vectors determine linear combinations of the M training set face images to form the eigenfaces $\mu_1$:

$$\mu_1 = \sum_{k=1}^{M} v_{lk} \Phi_k, \ 1=1,\ldots,M \quad \text{(Eq. 23)}$$

The foregoing analysis greatly reduces the calculations necessary to handle the image data, from the order of the number of pixels in the images ($N_2$) to the order of the number of images in the training set (M). In practice, the training set of face images can be relatively small ($M<<N_2$), although larger sets are also useful, and the calculations become quite manageable. The associated eigenvalues provide a basis for ranking or ordering the eigenvectors according to their usefulness in characterizing the variation among the images, or as a function of their similarity to an acquired image. Hence, the eigenvectors embody the maximum variance between images and successive eigenvectors have monotonically decreasing variance.

In practice, a smaller number of images M', or a subset of the images M, is sufficient for identification purposes, since complete and accurate reconstruction of the image is generally unnecessary to create a match. Framed as such, identification becomes essentially a pattern recognition task. Specifically, the eigenfaces span an M'-dimensional subspace of the original $N_2$ image space. The M' most significant eigenvectors of the L matrix are selected as those with the largest associated eigenvalues, and therefore contain the most useful image information, e.g., contain maximum variance information.

A newly acquired face is represented by a weighted series of eigenvectors formed from the most significant eigenvectors of the image sub-space. It is important to note that this recognition technique assumes that the image, which is not part of the original reference set of images, is sufficiently "similar" to those in the training set to enable it to be well represented by the eigenfaces. Hence, a new face image ($\Gamma$) is transformed into its eigenface components (i.e., projected into the face space) by a simple operation, namely, $$\omega_\kappa = \mu_\kappa^T (\Gamma - \Psi) \quad \text{(Eq. 24)}$$

for k=1, . . . ,M'. This describes a set of point-by-point image multiplications and summations, operations which can be performed at approximately frame rate on current image processing hardware.

The weights form a vector $\Omega^T = [\Omega_1 \Omega_2 \ldots \Omega_M]$ that describes the contribution of each eigenface in representing the input face image, treating the eigenfaces as a basis set for face images.

With reference to FIGS. 1 and 6, the Eigen head template stage 164 can include a database of the eigenfaces created by the foregoing Eigen approach. This information can be received by the compression stage 36 or by the discrimination stage 38. The compression stage 36 preferably communicates with the database of eigenfaces stored in the eigenhead template stage 164. The eye information 122 outputted by the first eye find stage 120 is projected by the compression stage 36 into eigenspace and a new set of coefficients is generated that correspond to a weighted sum of the eigen templates stored in the stage 164.

The discrimination stage 38 compares the coefficients corresponding to the new image with a pre-stored coefficient value, or threshold, to determine if a match occurs. Specifically, the foregoing vector $\Omega$ is used in a standard pattern recognition algorithm to find which of a number of pre-defined facial feature classes, if any, best describes the newly acquired image. The simplest method for determining which face class provides the best description of an input face image is to find the face class k that minimizes the Euclidean distance $$\epsilon_\kappa = \|(\Omega - \Omega\kappa)\|^2,$$

where $\Omega\kappa$ is a vector describing the kth face class. The face classes $\Omega_i$ are calculated by averaging the results of the eigenface representation over a small number of face images (as few as one) of each individual. A face is classified as belonging to class k when the minimum $\epsilon\kappa$ is below some chosen threshold $\Phi_\epsilon$. Otherwise the face is classified as "unknown", and optionally used to create a new face class or the system can deny the person access to the secured facility.

The Euclidean distance is thus employed to compare two facial image representations to determine an appropriate match, e.g., whether the face belongs to a selected face class of pre-stored images. Thus the recognition of the newly acquired face can be verified by performing a simple threshold analysis, that is, if the Euclidean distance is below some pre-determined threshold then there is a match, and the person, for example, can gain access to a secured facility.

Because creating the foregoing vector $\Omega^T$ of weights is equivalent to projecting the original face image onto the low-dimensional face space, many images project onto a given pattern vector. This is generally acceptable since the Euclidean distance $\epsilon$ between the image and the face space is simply the squared distance between the mean-adjusted input image $\Phi = \Gamma - \Psi$ and $\Phi_f = \Sigma_{\epsilon\omega\kappa} \mu_\kappa$, its projection onto face space (where the summation is over k from 1 to M'):

$$\epsilon^2 = \|(\Phi - \Phi_f)\|^2,$$

Thus, there are four possibilities for an input image and its pattern vector: (1) near face space and near a face class; (2) near face space but not near a known face class; (3) distant from face space and near a face class; and (4) distant from face space and not near a known face class.

In the first case, an individual is recognized and identified. In the second case, an unknown individual is present. The last two cases indicate that the image is not a face image. Case three typically shows up as a false positive in most other recognition systems. In the described embodiment, however, the false recognition may be detected because of the significant distance between the image and the subspace of expected face images.

To summarize, the eigenfaces approach to face recognition involves the steps of (1) collecting a set of characteristic face images of known individuals; (2) calculating the matrix L, (3) finding the corresponding eigenvectors and eigenvalues, (4) selecting the M' eigenvectors with the highest associated eigenvalues; (5) combining the normalized training set of images according to Eq. 7 to produce the reduced set of eigenfaces $\mu_\kappa$; (6) for each known individual, calculate the class vector $\Omega_\kappa$ by averaging the eigenface pattern vectors $\Omega$ calculated from the original images of the individual; (7) selecting a threshold $\theta_\epsilon$ which defines the maximum allowable distance from any face class; and (8) thresholding $\theta_1$ which defines the maximum allowable distance from face space.

For each new face to be identified, calculate its pattern vector $\Phi$, the distances $\epsilon_i$ to each known class, and the distance $\epsilon$ to face space. If the distance $\epsilon > \theta_1$, classify the input image as not a face. If the minimum distance $\epsilon_\kappa \leq \theta_\epsilon$ and the distance $\epsilon \leq \theta_1$, classify the input face as the individual associated with class vector $\Omega_\kappa$. If the minimum distance $\epsilon_\kappa > \theta_\epsilon$ and $\epsilon \leq \theta_1$, then the image may be classified as "unknown", and optionally used to begin a new face class.

Figure 12:
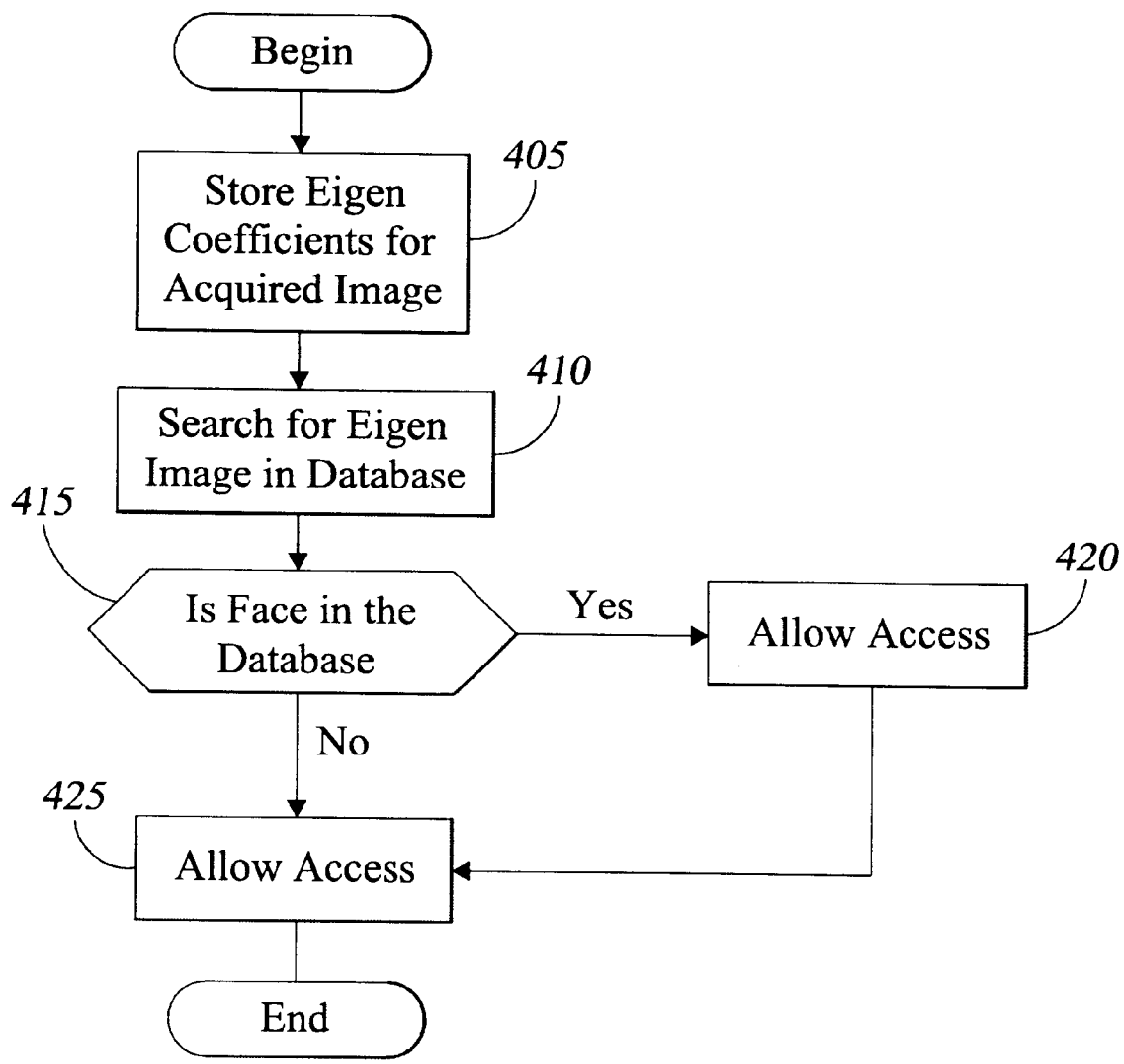
FIG. 12 is a flow-chart diagram illustrating the discrimination performed by the real time facial recognition system of FIG. 1 according to the teachings of the present invention.

FIG. 12 is a schematic flow-chart illustration of the discrimination or thresholding which occurs when the system 20 attempts to determine whether a match has occurred. Specifically, as set forth in step 405, the system stores the eigen coefficients in a selected memory location, such as the eigen template stage 164. After the compression stage 36 calculates or determines the new coefficients corresponding to the newly acquired image or ROI, the system 20 searches the eigen database for a match, step 410. The system then determines whether the newly acquired face/facial feature is in the database, as set forth in step 415. This searching and matching is performed by comparing the eigenvalues of the new face with a threshold value. If the new face is greater than the threshold value, then the system signifies a match, and the person is allowed access, for example, to a secured facility, step 420. If no match occurs, then the system reacquires an image and performs the steps and operations described above in connection with system 20, as set forth in step 425.

The foregoing system performs a number of operations, either singularly or in combination, that enables the acquisition, comparison and determination of a facial match in real-time, with minimal, if any, intrusion on the person. The system furthermore, is computationally efficient and therefore avoids the time and processor intensive applications performed by prior art facial recognition systems.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A system for refining an object within an image based on color, the system comprising:
    a storage element for storing flesh tone colors of a plurality of people,
    defining means for defining an unrefined region of interest corresponding to at least part of the object in the image, the unrefined region of interest including flesh tone colors,
    combination means for combining the unrefined region of interest with one or more of the flesh tone colors stored in the storage element to refine the region of interest to ensure that at least a portion of the image corresponding to the unrefined region of interest having flesh tone color is incorporated into the refined region of interest, and
    a motion detector for detecting motion of the image within a field of view, the motion detector comprises:
        a differencing means for subtracting selected pixel values associated with generally spatially adjacent images and for generating a difference value therefrom, and
        a threshold means for comparing the difference value with a threshold value to determine motion within the field of view.

2. A system in accordance with claim 1, wherein the refined region of interest being smaller than or about equal to the unrefined region of interest.

3. A system in accordance with claim 1, further comprising an image acquisition element for acquiring the image.

4. A system in accordance with claim 1, wherein the storage element comprises a look-up-table.

5. A system in accordance with claim 1, wherein the storage element comprises a memory element for storing a color histogram constructed from the plurality of people, the histogram being representative of the distribution of colors that constitute flesh tone.

6. A system in accordance with claim 1, further comprising blob means for connecting together selected pixels of the object in the image to form a selected number of blobs therein.

7. A system in accordance with claim 1, further comprising the detected motion signifying the presence of the object within the field of view, and
    blob means for connecting together a selected number of pixels of the object in the detected image to form a selected number of blobs therein, wherein one of the blobs corresponds to the unrefined region of interest.

8. A system in accordance with claim 7, wherein said unrefined region of interest corresponds to a head of a person, and the object corresponds to an eye of the person.

9. A system in accordance with claim 7, wherein the combination means is adapted to combine one of the blobs with the flesh tone colors to construct the refined region of interest.

10. A system in accordance with claim 1, further comprising
    first histogram means for sampling the flesh tone colors of the plurality of people and for generating a first flesh tone color histogram, and
    first transform means for transforming the first color histogram into ST color space.

11. A system in accordance with claim 7, further comprising normalizing means for normalizing the first color histogram.

12. A system in accordance with claim 10, further comprising conversion means for converting the histogram to a normalized function according to Bayes Rule.

13. A system in accordance with claim 10, wherein the flesh tone colors correspond to a face of a person within an image, the system further comprising second histogram means for generating a second color histogram not associated with the face within the image.

14. A system in accordance with claim 13, further comprising second transform means for transforming the second color histogram into ST color space.

15. A system in accordance with claim 1, further comprising
    histogram means for generating a histogram of colors corresponding to at least one of a face of a person in the image and a non-face portion of the image, and
    transforming means for transforming the histogram into ST color space.

16. A system in accordance with claim 1, further comprising histogram means for generating a histogram of colors corresponding to the object in the image.

17. A system in accordance with claim 1, further comprising means for adjusting the flesh tone colors stored within the storage element.

18. A system in accordance with claim 1, wherein the object corresponds to a face of a person within the image, the system further comprising erosion means for applying an erosion operation to the face to separate pixels corresponding to hair from pixels corresponding to face.

19. A system in accordance with claim 1, further comprising erosion means for applying an erosion operation to reduce the size of an object within the image, thereby reducing the size of the unrefined region of interest.

20. A system in accordance with claim 18, further comprising dilation means to expand one of the region of interests to obtain the object within the image.

21. A method of refining an object within an image based on color, the method comprising the steps of:
    storing flesh tone colors of a plurality of people in a storage element,
    defining an unrefined region of interest corresponding to at least part of the object in the image, the unrefined region of interest including flesh tone colors,
    detecting motion of the image within a field of view,
    connecting together a selected number of pixels of the object in the detected image to form a selected number of blobs therein, wherein one of the blobs corresponds to the unrefined region of interest, and combining one of the blobs that corresponds to the unrefined region of interest with one or more of the flesh tone colors stored in the storage element to refine the region of interest to ensure that at least a portion of the image corresponding to the unrefined region of interest having flesh tone color is incorporated into the refined region of interest, the refined region of interest being smaller than or about equal to the unrefined region of interest.

22. A method in accordance with claim 21, further comprising the step of generating a color histogram from the plurality of people, the histogram being representative of the distribution of colors that constitute flesh tone.

23. A method in accordance with claim 21, wherein the step of detecting motion comprises the steps of subtracting selected pixel values associated with generally spatially adjacent images captured by the image acquisition element and for generating a difference value therefrom, and comparing the difference value with a threshold value to determine whether motion is detected within the field of view.

24. A method in accordance with claim 21, further comprising the steps of sampling the flesh tone colors of the plurality of people, generating a first flesh tone color histogram from the sampling of flesh tone colors, and transforming the first color histogram into ST color space.

25. A method in accordance with claim 24, further comprising the step of normalizing the first color histogram according to Bayes Rule.

26. A method in accordance with claim 21, further comprising the step of generating a color histogram of the object in the image.

27. A method in accordance with claim 21, further comprising the steps of generating a color histogram of the object in the image, and transforming the second color histogram into ST color space.

28. A method in accordance with claim 21, further comprising the steps of generating a histogram of colors corresponding to at least one of a face of a person in the image and a non-face portion of the image, and transforming the histogram into ST color space.

29. A method in accordance with claim 21, further comprising the step of adjusting the flesh tone colors stored within the storage element.

30. A method in accordance with claim 21, further comprising the step of applying an erosion operation to a face within the image to separate pixels corresponding to hair from pixels corresponding to the face.

31. A method in accordance with claim 21, further comprising the step of applying a dilation operation to expand one of the region of interests to obtain the face.

32. A facial recognition and identification system for identifying an object in an image, comprising:

an image acquisition element for acquiring the image, defining means for defining an unrefined region of interest corresponding to at least part of the object in the image, the unrefined region of interest including flesh tone colors, combination means for combining one of a selected number of blobs that corresponds to the unrefined region of interest with one or more of the flesh tone colors to refine the region of interest to ensure at least a portion of the image corresponding to the unrefined region of interest that includes flesh tone color are incorporated into the refined region of interest, the refined region of interest being smaller than or about equal to the unrefined region of interest, said refined region of interest corresponding at least in part to the object, and a recognition module for determining whether the acquired object matches a pre-stored object, whereby said system recognizes the object when the object matches the pre-stored object.

33. A facial recognition system in accordance with claim 32, further comprising a detection module for detecting a feature of the object.

34. A facial recognition system in accordance with claim 32, wherein said detection module comprises:

a motion detector for detecting motion of the image within a field of view, and blob means for connecting together a selected number of pixels of the object in the detected image to form the selected number of blobs therein.

35. A facial recognition system in accordance with claim 34, wherein said detector module further comprises selector means for selecting at least a portion of the object in the image.

36. A facial recognition system in accordance with claim 33, wherein said detection module comprises means for generating one or more eigenheads corresponding to a set of eigenvectors generated from a reference set of images in a multi-dimensional image space, means for scaling said eigenhead to a size generally about that of the object in the image, and comparison means for comparing the eigenhead to the refined region of interest corresponding to the object in the image to determine whether there is a match.

37. A facial recognition system in accordance with claim 36, wherein said eigenhead is a low resolution eigenhead.

38. A facial recognition system in accordance with claim 32, further comprising location means for locating a feature of the object.

39. A facial recognition system in accordance with claim 38, wherein said location means comprises means for representing a feature of the region of interest in the object as a plurality of eigenvectors in a multi-dimensional image space, and correlation means for correlating the region of interest with the eigenvectors to locate the feature within the object.

40. A facial recognition system in accordance with claim 39, further comprising a compression module for generating a set of eigenvectors of a training set of people in the multi-dimensional image space, and projection means for projecting the feature onto the multi-dimensional image space to generate a weighted vector that represents the feature.

41. A facial recognition system in accordance with claim 40, further comprising discrimination means for comparing the weighted vector corresponding to the feature with a pre-stored vector to determine whether there is a match.

42. A facial recognition system in accordance with claim 34, wherein the motion detector comprises differencing means for subtracting selected pixel values associated with generally spatially adjacent images captured by the image acquisition element and for generating a difference value therefrom, and threshold means for comparing the difference value with a threshold value to determine motion within the field of view.

43. A facial recognition system in accordance with claim 32, further comprising first histogram means for sampling the flesh tone colors of the plurality of people and for generating a first flesh tone color histogram, and first transform means for transforming the first color histogram into ST color space.

44. A facial recognition system in accordance with claim 43, further comprising normalizing means for normalizing the first color histogram according to Bayes Rule.

45. A facial recognition system in accordance with claim 43, wherein the flesh tone colors correspond to a face of a person within an image, the system further comprising second histogram means for generating a second color histogram not associated with the face within the image, and second transform means for transforming the second color histogram into ST color space.

46. A facial recognition system in accordance with claim 32, further comprising histogram means for generating a histogram of flesh tone colors corresponding to at least one of a face of a person in the image and a non-face portion of the image, and transform means for transforming the histogram into ST color space.

47. A facial recognition system in accordance with claim 32, further comprising histogram means for generating a histogram of flesh tone colors corresponding to the object in the image.

48. A facial recognition system in accordance with claim 32, wherein the object corresponds to a face of a person within the image, the system further comprising erosion means for applying an erosion operation to the face to separate pixels corresponding to hair from pixels corresponding to face.

49. A facial recognition system in accordance with claim 32, further comprising erosion means for applying an erosion operation to the image to reduce the size of an object within the image, thereby reducing the size of the unrefined region of interest.

50. A facial recognition system in accordance with claim 32, further comprising dilation means for applying a dilation operation to expand one of the region of interests to obtain a face image corresponding to the object within the image.

51. A facial recognition system in accordance with claim 39, wherein said correlation means further comprises means for storing a center-weighted windowing function, means for placing the windowing function over the region of interest, and means for analyzing the region of interest with the windowing function to locate the feature of the object.

52. A facial recognition system in accordance with claim 39, wherein said correlation means further comprises means for analyzing the region of interest with a center-weighted windowing function to locate the feature of the object.

53. A facial recognition system in accordance with claim 38, further comprising second location means for determining the location of the feature of the object when the first location module is unable to locate the feature.

54. A facial recognition system in accordance with claim 53, wherein said second location means comprises means for representing the region of interest in the object as a plurality of eigenvectors in a multi-dimensional image space, and correlation means for correlating the region of interest with the eigenvectors.

55. A facial recognition system in accordance with claim 54, wherein said second location module further comprises second means for representing a feature of the region of interest in the object as a plurality of eigenvectors in a multi-dimensional image space, and correlation means for correlating the region of interest with the eigenvectors to locate the feature in the image.

56. A facial recognition system in accordance with claim 32, further comprising means for adjusting one of the contrast and brightness of the image.

57. A facial recognition system in accordance with claim 32, further comprising means for correlating the image with a windowing function to generate a correlation map.

58. A facial recognition system in accordance with claim 32, further comprising means for determining a standard deviation and a mean of pixels that constitute the image.

* * * * *